(12) United States Patent
You et al.

(10) Patent No.: US 12,713,381 B2
(45) Date of Patent: Aug. 18, 2026

(54) METHOD AND APPARATUS FOR POSITIONING TERMINAL, DEVICE, AND MEDIUM

(71) Applicant: GUANGDONG OPPO MOBILE TELECOMMUNICATIONS CORP., LTD., Dongguan (CN)

(72) Inventors: Xin You, Dongguan (CN); Qianxi Lu, Dongguan (CN); Bingxue Leng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 333 days.

(21) Appl. No.: 18/386,466

(22) Filed: Nov. 2, 2023

(65) Prior Publication Data

US 2024/0064688 A1 Feb. 22, 2024

Related U.S. Application Data

(63) Continuation of application No. PCT/CN2021/103807, filed on Jun. 30, 2021.

(51) Int. Cl.

| | |
|---|---|
| ***H04W 64/00*** | (2009.01) |
| ***H04B 17/318*** | (2015.01) |
| ***H04L 5/00*** | (2006.01) |

(52) U.S. Cl.

CPC .......... *H04W 64/00* (2013.01); *H04B 17/328* (2023.05); *H04L 5/0051* (2013.01)

(58) Field of Classification Search

CPC ..... H04W 64/00; H04W 88/18; H04W 92/18; H04B 17/328; H04L 5/0051; G01S 2205/01; G01S 5/0072; G01S 5/0205

(Continued)

(56) References Cited

U.S. PATENT DOCUMENTS

2019/0044677 A1* 2/2019 Ly .......................... H04B 7/088
2021/0136527 A1 5/2021 Tadayon (Continued)

FOREIGN PATENT DOCUMENTS

CN 112789912 A 5/2021
CN 112995899 A 6/2021

(Continued)

OTHER PUBLICATIONS

International Search Report in the international application No. PCT/CN2021/103807, mailed on Mar. 15, 2022, 5 pages with English translation.

(Continued)

*Primary Examiner* — Don N Vo
(74) *Attorney, Agent, or Firm* — BAYES PLLC

(57) ABSTRACT

The present application discloses a method for positioning a terminal and a first terminal. The method comprises: a first terminal receiving a first reference signal sent by at least one second terminal, the first reference signal being a positioning reference signal of a sidelink; and the first terminal positioning a target terminal according to the first reference signal. The present application provides a brand-new positioning service in a communication scenario of a sidelink, and a positioning result for a target terminal can be obtained by interaction between different terminals.

20 Claims, 9 Drawing Sheets

(58) Field of Classification Search
USPC ........................................................ 455/456.1
See application file for complete search history.

(56) References Cited

U.S. PATENT DOCUMENTS

| | | | | |
|---|---|---|---|---|
| 2021/0160812 | A1 | 5/2021 | Manolakos | |
| 2021/0219103 | A1 | 7/2021 | Wang | |
| 2022/0196780 | A1 * | 6/2022 | Dwivedi | H04W 8/12 |
| 2022/0244344 | A1 * | 8/2022 | Bao | H04W 8/24 |
| 2022/0279313 | A1 * | 9/2022 | Huang | H04W 72/044 |
| 2022/0295442 | A1 | 9/2022 | Goyal | |
| 2023/0262647 | A1 * | 8/2023 | Ren | G01S 5/0036 455/456.1 |

FOREIGN PATENT DOCUMENTS

| | | | |
|---|---|---|---|
| WO | 2021030583 | A1 | 2/2021 |
| WO | 2021092813 | A1 | 5/2021 |
| WO | 2021097598 | A1 | 5/2021 |

OTHER PUBLICATIONS

English translation of the Written Opinion of the International Search Authority in the international application No. PCT/CN2021/103807, mailed on Mar. 15, 2022, 8 pages with English translation.
LG Electronics, FirstNet, "New SID: Study on scenarios and requirements of in-coverage, partial coverage, and out-of-coverage positioning use cases" clean, 3GPP TSG RAN Meeting #88e RP-201384, Electronic Meeting, Jun. 29-Jul. 3, 2020, 4 pages.
LG Electronics, FirstNet, "New SID: Study on scenarios and requirements of in-coverage, partial coverage, and out-of-coverage positioning use cases", revision, 3GPP TSG RAN Meeting #88e RP-201384, Electronic Meeting, Jun. 29-Jul. 3, 2020, 4 pages.
Supplementary European Search Report in the European application No. 21947593.6, mailed on May 15, 2024. 7 pages.

* cited by examiner

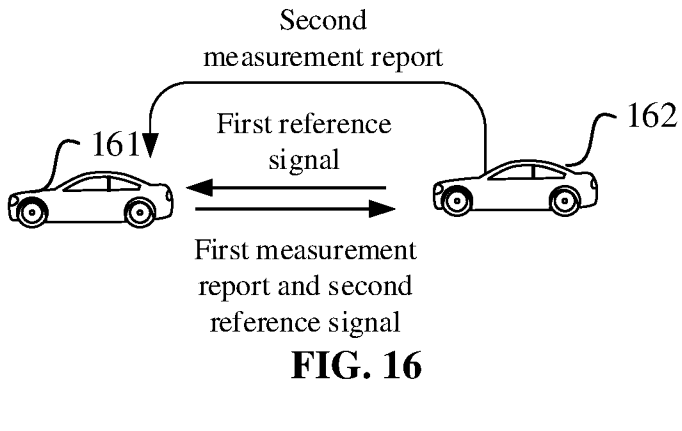
FIG. 16
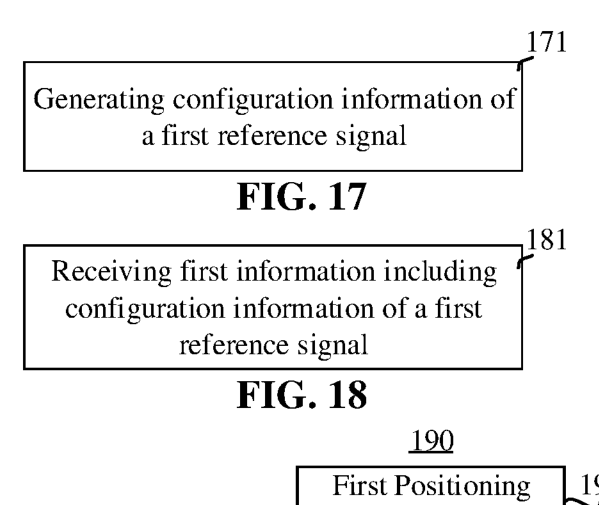
FIG. 17
FIG. 18
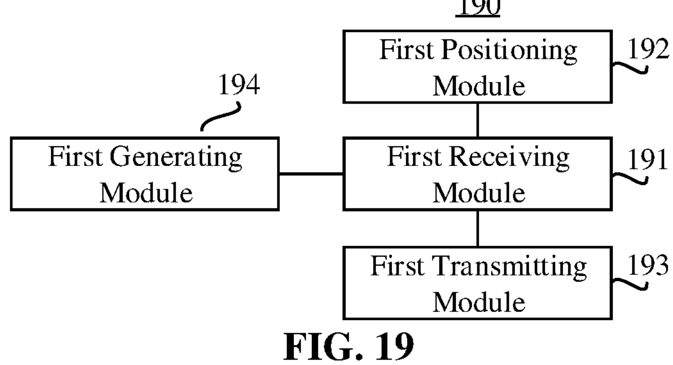
FIG. 19
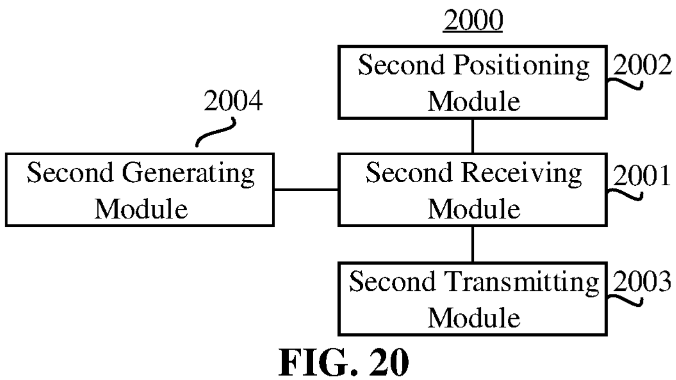
FIG. 20

METHOD AND APPARATUS FOR POSITIONING TERMINAL, DEVICE, AND MEDIUM

CROSS-REFERENCE TO RELATED APPLICATION

The present application is a continuation of International Application No. PCT/CN2021/103807 filed on Jun. 30, 2021, the disclosure of which is hereby incorporated by reference in its entirety.

BACKGROUND

A positioning service is one of indispensable services in daily life. Positioning technologies based on the radio technology have been widely used.

In the related art, positioning reference signals (PRSs) are transmitted by multiple base stations in a mobile communication system. A terminal positions its own location based on the positioning reference signals transmitted by the multiple base stations.

In a side link (SL)-based communication scenario, a base station is not necessary. Therefore, how to position based on the SL is an urgent technical problem to be studied.

SUMMARY

The disclosure relates to the field of communication technologies, in particular, to a method for positioning a terminal and a first terminal.

Embodiments of the present disclosure provide methods for positioning a terminal and a first terminal, and provide a positioning service under the SL-based communication scenario.

In an aspect of embodiments of the present disclosure, a method for positioning a terminal is provided. The method includes following two operations.

The first terminal receives a first reference signal transmitted by a second terminal, where a first reference signal is a positioning reference signal for a side link.

The first terminal positions a target terminal based on the first reference signal.

In another aspect of embodiments of the present disclosure, a method for positioning a terminal is provided. The method includes following operation.

The second terminal transmits a first reference signal to a first terminal, where the first reference signal is used for positioning a target terminal, and the first reference signal is a positioning reference signal for a side link.

In another aspect of embodiments of the present disclosure, a terminal is provided. The terminal includes:

a processor;

a transceiver connected to the processor; and a memory configured to store processor-executable instructions.

The processor is configured to load and execute the executable instructions to implement the method for positioning a terminal as described in any one of the above.

BRIEF DESCRIPTION OF THE DRAWINGS

FIG. 16 is a schematic diagram of a method for positioning a terminal according to an exemplary embodiment.

FIG. 17 is a flowchart of a method for positioning a terminal according to an exemplary embodiment.

FIG. 18 is a schematic diagram of a method for positioning a terminal according to an exemplary embodiment.

FIG. 19 is a block diagram of a device for positioning a terminal according to an exemplary embodiment.

FIG. 20 is a block diagram of a device for positioning a terminal according to an exemplary embodiment.

DETAILED DESCRIPTION

Here, exemplary embodiments will be described in detail, examples of which are illustrated in the accompanying drawings. The following description refers to the accompanying drawings in which the same reference numbers in different drawings represent the same or similar elements unless otherwise represent. The implementations set forth in the following description of exemplary embodiments do not represent all implementations consistent with the represent disclosure. Instead, they are merely examples of apparatuses and methods consistent with aspects related to the invention as recited in the appended claims.

Figure 1:
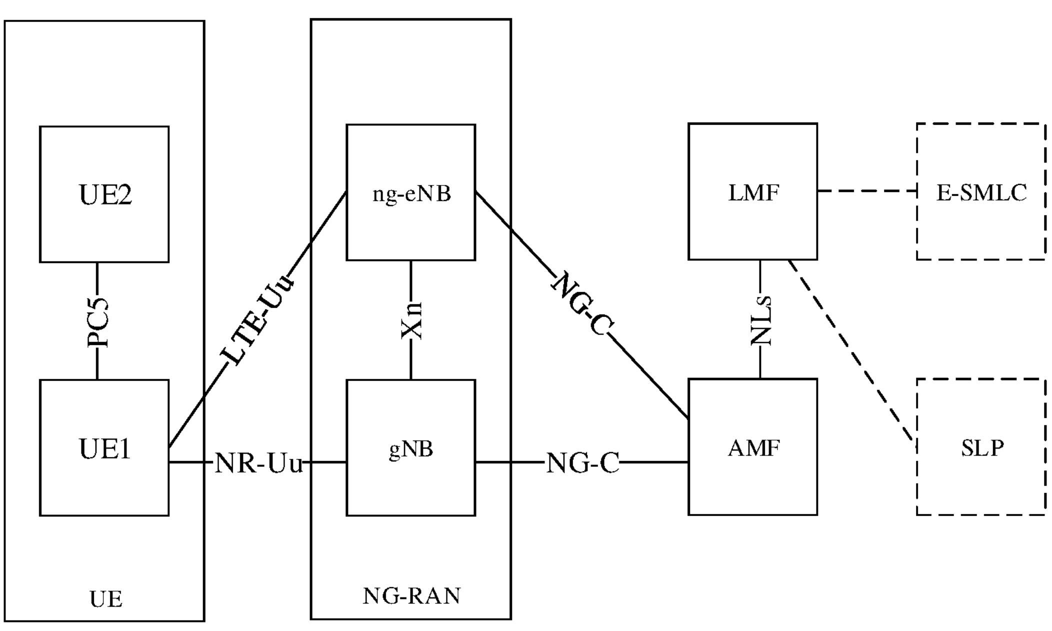
FIG. 1 is a schematic diagram of a communication system according to an exemplary embodiment.

FIG. 1 is a schematic diagram of a communication system architecture according to an exemplary embodiment of the present disclosure. As shown in FIG. 1, the system architecture may include: user equipment (UE), a next generation-radio access network (NG-RAN), a location management function (LMF), an access and mobility management function (AMF), an enhanced-service mobile location center (E-SMLC), and a service location protocol (SLP).

The UE is an entrance for mobile users to interact with a network, and the UE may provide basic computing abilities and storage abilities, display service windows to users and accept a user operation input. The UE will adopt the next generation air interface technology to establish a signal connection and a data connection with the NG-RAN, so as to transmit control signals and service data to a mobile network. The UEs can be linked on the side link through proximity communication 5 (PC5) interface. The link and communication between different UEs on the side link can be implemented through the PC5 interface. For example, UE1 communicates with UE2 through a PC5 interface-based side link.

The NG-RAN includes an upgraded next generation-evolved Node B (ng-eNB) and next generation-NodeB (gNB). The ng-eNB is a network element of the NG-RAN. The ng-eNB may provide a measurement result used for location estimation, measurement radio signals for a target UE, and transmit measurement results to the LMF.

The ng-eNB measurements (on demand or periodically) in response to a request from the LMF. The ng-eNB may serve multiple TPs, including, for example, a remote radio head and only PRS for PRS-based terrestrial beacon system positioning of the Evolving-Universal Terrestrial Radio Access (E-UTRA). The gNB is a network element of the NG-RAN and may provide measurement information to the target UE and transmit this information to the LMF. It should be noted that the gNB and the ng-eNB may not always exist simultaneously. When both the gNB and the ng-eNB exist, the NG-C interface exists for only one of the gNB and the ng-eNB. The UE communicates with the gNB through a new radio-user equipment (NR-Uu) interface. The NR-Uu interface is one of several transmission links in a LTE positioning protocol of the target UE having the NR access to the NG-RAN. The UE communicates with the ng-eNB through a long term evolution-user equipment (LTE-Uu) interface. The LTE-Uu interface is one of several transmission links in the LTE positioning protocol.

The LMF is used for managing supports for different location services for a target UE and location services include the positioning of the UE and delivery of auxiliary data to the UE. The LMF may interact with the serving gNB or the serving ng-eNB to be used for the target UE, so as to obtain location measurement of the UE including uplink measurement performed by the ng-eNB and downlink measurement provided by the UE to the ng-eNB. The evolved Node B (eNB) is configured to, such as, support handover, which is taken as a part of other functions. The LMF may interact with the target UE to transmit auxiliary data when requesting a specific location service, or to obtain a location estimate if requested.

The AMF is configured to receive a request for several location services associated with a specific target UE from another entity, or the AMF decides by itself to initiate several location services (e.g. a service for an IP multimedia subsystem (IMS) emergency call from the specific target UE) on behalf of the specific target UE. The AMF then transmits a location service request to the LMF. The LMF processes the location service request, which may include transmitting assistance data to the target UE to assist UE-based positioning and/or UE-assisted positioning and/or may include positioning of the target UE. Then, in the case where the LMF returns a result of the location service to the AMF requesting for the location service, the AMF returns the result of the location service to the entity.

The E-SMLC is used for positioning the location of the UE.

The SLP is a secure user plane (SUPL) entity responsible for positioning on the user plane.

Figure 2:
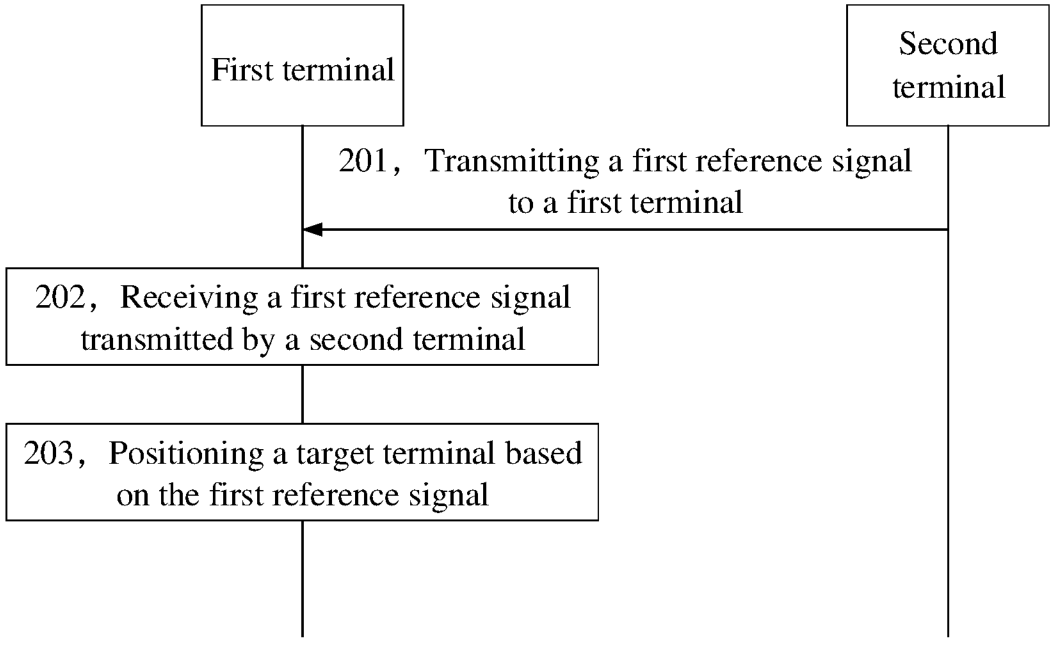
FIG. 2 is a flowchart of a method for positioning a terminal according to an exemplary embodiment.

FIG. 2 is a flowchart of a method for positioning a terminal according to an exemplary embodiment of the present disclosure. The embodiment is exemplified by taking the embodiment being applied to a communication system shown in FIG. 1 as an example, and the method includes operations 201 to 203.

In operation 201, a second terminal transmits a first reference signal to a first terminal.

The number of the second terminals is one or more. For example, in a case where a relative location of the first terminal is measured, the number of the second terminals is one. For another example, in a case where a relative distance between the first terminal and the second terminal is measured, the number of the second terminals is one. For another example, in a case where an absolute location of the first terminal is measured, the number of the second terminals is three, and so on. The number of the second terminals is not limited in this embodiment.

The first reference signal is a positioning reference signal for a side link. The first reference signal is a positioning reference signal or a location reference signal that is used on the side link. In other words, the first reference signal is a reference signal used for positioning a target terminal under a SL-based scenario. The first reference signal is used for determining location information of the target terminal and/or distance information of the target terminal. The location information includes an absolute location or a relative location.

Optionally, the target terminal is the first terminal or the second terminal.

Optionally, the first terminal or the second terminal is at least one of a terminal device or a road side unit (RSU).

In operation 202, the first terminal receives a first reference signal transmitted by a second terminal.

In a case of multiple second terminals, the second terminal may be understood as multiple terminal entities or understood as multiple antenna units of the same terminal entity.

For example, a certain terminal entity includes two antenna units, and a first reference signal transmitted by one antenna unit is different from a first reference signal transmitted by the other antenna unit. The two antenna units may be understood as two second terminals.

In operation 203, the first terminal positions a target terminal based on the first reference signal.

Optionally, the first terminal adopts a positioning technology where a time difference is used for positioning to position the target terminal based on the first reference signal. Exemplarily, the time difference is the time differences between the reference signals transmitted by the second terminals at different locations, or the receive-transport (Rx-Tx) time differences of the reference signals of the second terminals at the same location.

Optionally, the first terminal adopts a positioning technology where an angle is used for positioning to position the target terminal based on the first reference signal. The angle is an angle of arrival of the first reference signal or an angle of departure of the first reference signal.

Schematically, the target terminal is the first terminal or the second terminal.

To sum up, the method provided by the embodiment implements the positioning of the target terminal through the first reference signal transmitted on the side link, and the positioning result of the target terminal may be obtained by the interaction between the terminals, which can improve the positioning efficiency and reduce the calculation pressure of the network device. a method for positioning a terminal based on the side link is also provided.

Figures 3, 4:
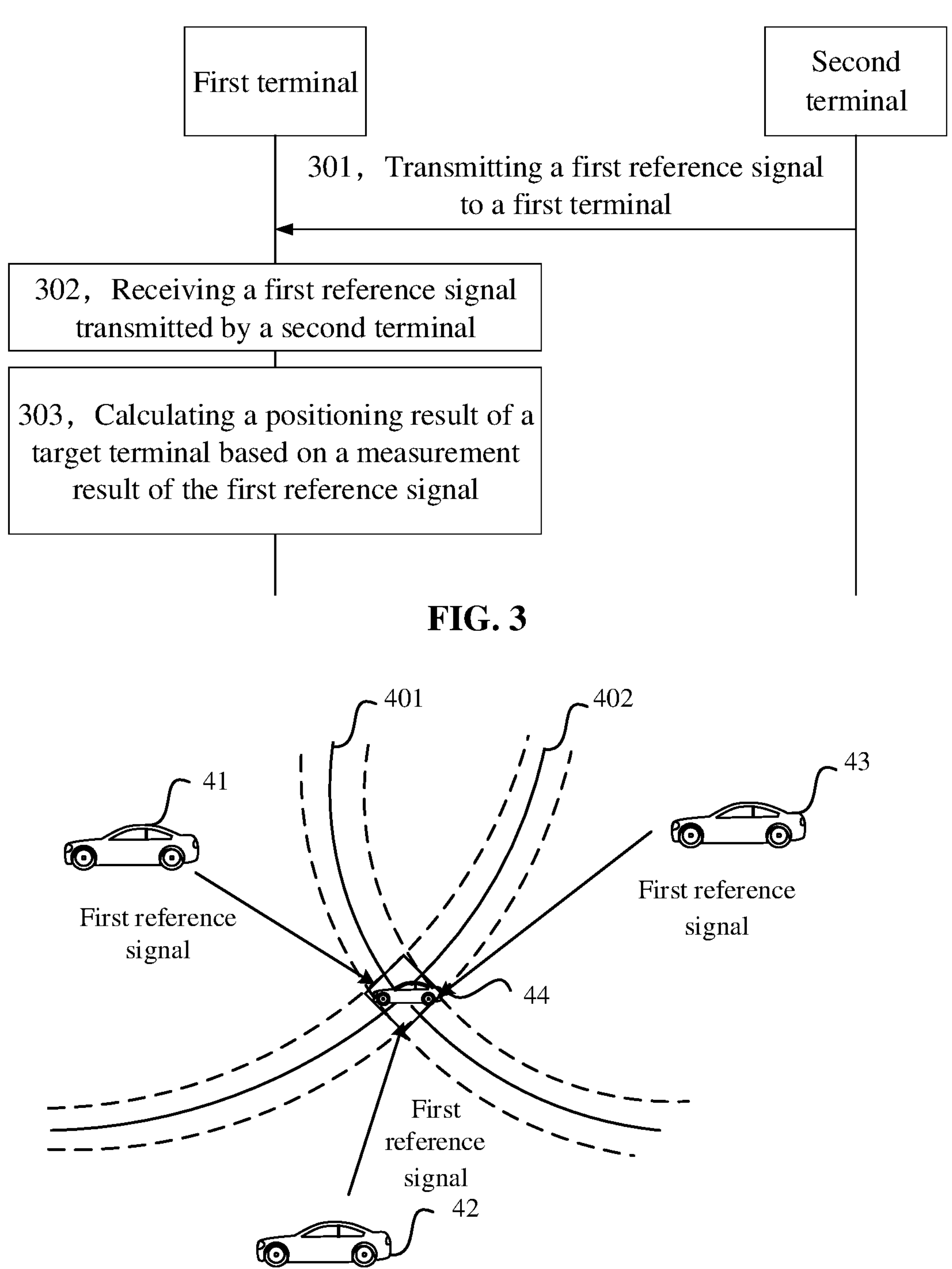
FIG. 3 is a flowchart of a method for positioning a terminal according to an exemplary embodiment.
FIG. 4 is a schematic diagram of a method for positioning a terminal according to an exemplary embodiment.

FIG. 3 is a flowchart of a method for positioning a terminal according to an exemplary embodiment of the present disclosure. The embodiment is exemplified by taking the embodiment being applied to a communication system shown in FIG. 1 as an example, and the method includes operations 301 to 303.

In operation 301, a second terminal transmits a first reference signal to a first terminal.

The number of the second terminals is one or more. For example, in a case where a relative location of the first terminal is measured, the number of the second terminals is one. For another example, in a case where a relative distance between the first terminal and the second terminal is measured, the number of the second terminals is one. For another example, in a case where an absolute location of the first terminal is measured, the number of the second terminals is three, and so on. The number of the second terminals is not limited in this embodiment.

The first reference signal is a positioning reference signal for the side link. The first reference signal is a positioning reference signal or a location reference signal that is used on the side link. In other words, the first reference signal is a reference signal used for positioning a target terminal under a SL-based scenario. The first reference signal is used for determining location information of a target terminal and/or distance information of the target terminal. The location information includes an absolute location or a relative location.

Exemplary, the first reference signal is at least one of: a side link-position reference signal (SL-PRS), a channel state information-reference signal (CSI-RS), a demodulation reference signal (DMRS), a phase tracking reference signal (PTRS), a system synchronization block (SSB), or a sounding reference signal (SRS).

Exemplarily, as shown in FIG. 4, each of the second terminal 41, the second terminal 42 and the second terminal 43 transmits a first reference signal to the first terminal 44.

In operation 302, the first terminal receives a first reference signal transmitted by a second terminal.

In a case of multiple second terminals, the second terminal may be understood as multiple terminal entities or understood as multiple antenna units of the same terminal entity.

For example, a certain terminal entity includes two antenna units, and a first reference signal transmitted by one antenna unit is different from a first reference signal transmitted by the other antenna unit. The two antenna units may be understood as two second terminals.

In operation 303, the first terminal calculates a positioning result of a target terminal based on a measurement result of the first reference signal.

Optionally, a measurement result of the first reference signal includes at least one of: reference signal received power (RSRP) of the first reference signal; reference signal received quality (RSRQ) of the first reference signal; an angle of arrival of the first reference signal; an angle of departure of the first reference signal; a time stamp of the measurement result; an receive-transport (Rx-Tx) time difference; a first reference signal propagation delay; quality for each measurement result; or a time difference of arrival.

The Rx-Tx time difference includes an Rx-Tx time difference associated with a transmission time of the first reference signal or an Rx-Tx time difference associated with a reception time of the first reference signal.

The target terminal is at least one of the first terminal or the second terminal.

Optionally, the manner for calculating the positioning result of the target terminal based on the measurement result of the first reference signal includes, but is not limited to, a manner based on at least one of: a time difference of arrival (TDOA), a side link-time difference of arrival (SL-TDOA), a side link-angle of departure (SL-AoD), a side link-angle of arrival (SL-AoA), an enhanced-cell identity document (E-CID), an angle of arrival (AoA), an angle of departure (AoD), a time of arrival (ToA), a multiple round trip time (Multi-RTT), or a network assisted-global navigation satellite system (A-GNSS).

For example, as shown in FIG. 4, taking the manner for calculating the positioning result of the target terminal being a manner based on a time difference and the target terminal being the first terminal as an example, the principle of the method is that a trajectory of a moving point having a fixed distance difference between a distance from the moving point to a fixed point and a distance from the moving point to the other fixed point in the plane is hyperbola.

When the first terminal 44 receives two first reference signals respectively transmitted by the second terminal 41 and the second terminal 42, there is a first time difference between the reception times of the two first reference signals. In a case where propagation speeds of the first reference signals and the first time difference are given, a first distance difference between a distance from the first terminal 44 to the second terminal 41 and a distance from the first terminal 44 to the second terminal 42 may be calculated. Then the first terminal 44 is positioned on a hyperbola 401 with the second terminal 41 and the second terminal 42 as focuses and the first distance difference as a fixed difference.

Similarly, when the first terminal 44 receives two first reference signals respectively transmitted by the second terminal 42 and the second terminal 43, there is a second time difference between the reception times of the two first reference signals. In a case where propagation speeds of the first reference signals and the second time difference are given, a second distance difference between a distance from the first terminal 44 to the second terminal 42 and a distance from the first terminal 44 to the second terminal 43 may be calculated. Then the first terminal 44 is positioned on a hyperbola 402 with the second terminal 42 and the second terminal 43 as focuses and the second distance difference as a fixed difference. The first terminal 44 may position the location of the first terminal 44 based on an intersection point of the hyperbola 401 and the hyperbola 402.

Optionally, when the manner for calculating the positioning result of the target terminal is a manner based on a time difference, the measurement result of the first reference signal obtained by the first terminal includes at least one of the measurement results as shown in Table 1.

TABLE 1

| measurement results of the first reference signal<br>Measurement result |
|---|
| Latitude/Longitude/Altitude, together with uncertainty shape |
| physical cell identification (PCI) for each measurement, |
| cell global identity (GCI) for each measurement, transmission receive point identification (TRP ID) |
| for each measurement/reference signal identification (RS ID) |
| for each measurement and Destination ID |
| Side Link Reference Signal Time Difference (SLRSTD) measurement |
| Side Link-Pseudo Random Sequence-Reference Signal Receiving Power (SL-PRS-RSRP) measurement |
| Time stamp of the measurement result |
| Time stamp of location estimate |
| Quality for each measurement result |
| Time difference of arrival |

Exemplarily, taking the manner for calculating the positioning result of the target terminal being a manner based on a time difference as an example, a second terminal transmits a first reference signal to a first terminal; after the first terminal receives the first reference signal, the first terminal may determine a relative distance and a relative angle between the first terminal and the second terminal based on a measurement result of the first reference signal. The first terminal may determine the location of the first terminal or the location of the second terminal based on the relative distance and the relative angle.

Optionally, when the manner for calculating the positioning result of the target terminal is a manner based on a time difference, the measurement result of the first reference signal obtained by the first terminal includes at least one of the measurement results as shown in Table 2.

TABLE 2

| measurement results of the first reference signal<br>Measurement result |
|---|
| PCI, GCI and TRP ID/RS ID for the measurement |
| UE destination ID, AoA (azimuth and elevation), AOD |
| PRS-RSRP measurement |
| Time stamp of the measurement result |
| Quality for each measurement result |

To sum up, according to the method provided by the embodiment, the calculation for the positioning result is performed by the first terminal, which does not need to consume resources of the network device and can reduce the operation cost of the network device. On the other hand, it does not need to report data to the network device during the calculation, which can save the resources of the uplink channel and the downlink channel and ensure that the calculation has better real-time performance.

Figure 5:
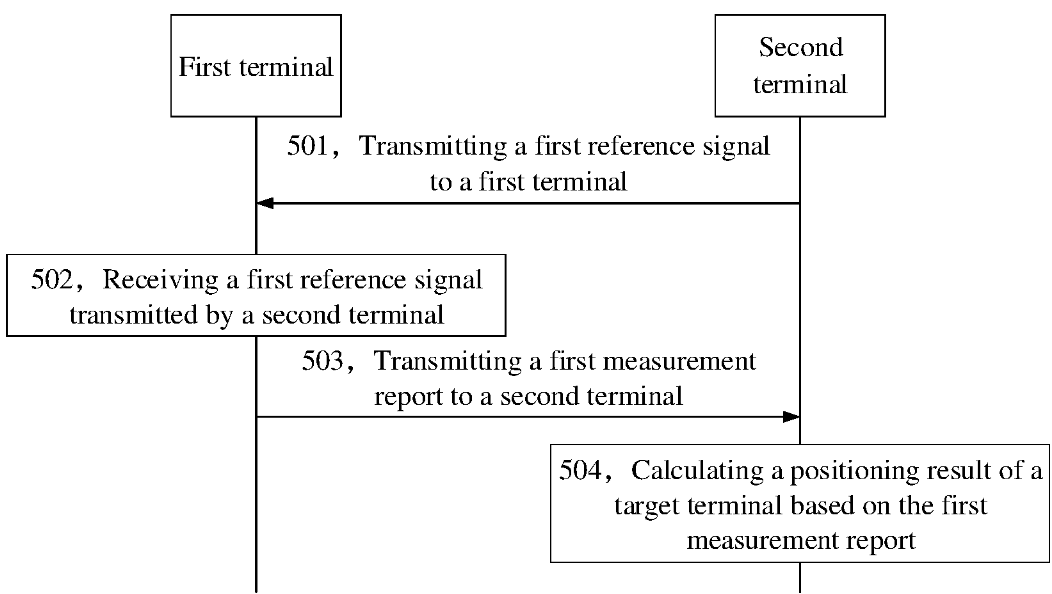
FIG. 5 is a flowchart of a method for positioning a terminal according to an exemplary embodiment.

FIG. 5 is a flowchart of a method for positioning a terminal according to an exemplary embodiment of the present disclosure. The embodiment is exemplified by taking the embodiment being applied to the communication system shown in FIG. 1 as an example. The method includes operations 501 to 504.

In operation 501, a second terminal transmits a first reference signal to a first terminal.

The number of the second terminals is one or more. For example, in a case where a relative location of the first terminal is measured, the number of the second terminals is one. For another example, in a case where a relative distance between the first terminal and the second terminal is measured, the number of the second terminals is one. For another example, in a case where an absolute location of the first terminal is measured, the number of the second terminals is three, and so on. The number of the second terminals is not limited in this embodiment.

The first reference signal is a positioning reference signal for the side link. The first reference signal is a positioning reference signal or a location reference signal that is used on the side link. In other words, the first reference signal is a reference signal used for positioning a target terminal under a SL-based scenario. The first reference signal is used for determining location information of the target terminal and/or distance information of the target terminal. The location information includes an absolute location or a relative location.

Exemplarily, the first reference signal includes at least one of a SL-PRS, a CSI-RS, a DMRS, a PTRS, a SSB, or a SRS.

Figure 6:
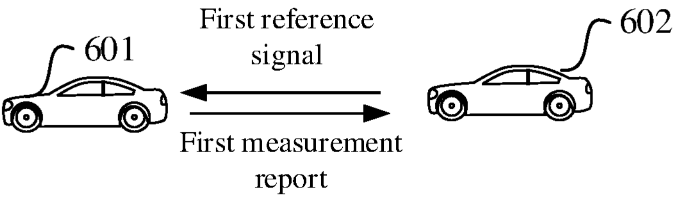
FIG. 6 is a schematic diagram of a method for positioning a terminal according to an exemplary embodiment.

Exemplarily, as shown in FIG. 6, the second terminal 602 transmits a first reference signal to the first terminal 601.

In operation 502, the first terminal receives a first reference signal transmitted by a second terminal.

In a case of multiple second terminals, the second terminal may be understood as multiple terminal entities or understood as multiple antenna units of the same terminal entity.

For example, a certain terminal entity includes two antenna units, and a first reference signal transmitted by one antenna unit is different from a first reference signal transmitted by the other antenna unit. The two antenna units may be understood as two second terminals.

In operation 503, the first terminal transmits a first measurement report to the second terminal.

The first measurement report includes a measurement result of the first reference signal.

Exemplarily, the first measurement result of the first reference signal includes at least one of: RSRP/RSRQ of the first reference signal; an angle of arrival of the first reference signal; an angle of departure of the first reference signal; a time stamp of the first measurement result; a Rx-Tx time difference; a first reference signal propagation delay; quality for each measurement result; or a time difference of arrival of the first reference signal.

The Rx-Tx time difference includes an Rx-Tx time difference associated with a transmission time of the first reference signal or an Rx-Tx time difference associated with a reception time of the first reference signal.

Exemplarily, the first terminal 601 transmits the first measurement report to the second terminal 602, as shown in FIG. 6.

In operation 504, the second terminal calculates a positioning result of a target terminal based on the first measurement report.

The target terminal is at least one of the first terminal or the second terminal.

Optionally, the manner of calculating the location result of the target terminal includes, but is not limited to, a manner based on at least one of: a TDOA, a SL-TDOA, a SL-AOA, an E-CID, an AoD, a ToA, a Multi-RTT, or an A-GNSS.

For example, as shown in FIG. 6, when the manner for calculating the positioning result of the target terminal is an angle-based manner, the first terminal 601 transmits a first measurement report to the second terminal 602, and the second terminal 602 may calculate a relative distance and a relative angle between the first terminal 601 and the second terminal 602 based on the first measurement report, to determine positioning information of the first terminal 601 or the second terminal 602.

Optionally, when the manner for calculating the positioning result of the target terminal is a manner based on an angle, the measurement result of the first reference signal obtained by the first terminal includes at least one of the measurement results as shown in Table 3.

TABLE 3

| measurement results of the first reference signal<br>Measurement result |
|---|
| PCI, GCI and TRP ID/RS ID of the measurement |
| UE destination ID, AoA (azimuth and elevation), AOD |
| PRS-RSRP |
| Time stamp of the measurement result |
| Quality for each measurement result |

Exemplarily, taking the manner for calculating the positioning result of the target terminal being a manner based on a time difference as an example, each of the multiple second terminals transmits a first reference signal to a first terminal; the first terminal obtains time differences of receiving different first reference signals. After the first terminal transmits the first measurement report to each of the multiple second terminals, the second terminal may determine the positioning result of the first terminal or the second terminal based on the time differences included in the first measurement report.

Optionally, when the manner for calculating the positioning result of the target terminal is a manner based on a time difference, the measurement result of each first reference signal obtained by the first terminal includes at least one of the measurement results as shown in Table 4.

TABLE 4

| measurement results of the first reference signal<br>Measurement result |
|---|
| Latitude/Longitude/Altitude, together with uncertainty shape |
| PCI, GCI, TRP ID/RS ID, and Destination ID |
| SL RSTD |
| SL-PRS-RSRP |
| Time stamp of the measurement result |
| Time stamp of location estimate |
| Quality for each measurement result |
| Time difference of arrival |

To sum up, according to the method provided by the embodiment, since the calculation for the positioning result is implemented by the second terminal, it does not need to consume the resources of the network device and can reduce the operation cost of the network device. On the other hand, it does not need to report data to the network device during the calculation, which can save the resources of the uplink channel and the downlink channel. Moreover, a method for calculating the positioning result is provided for the first terminal having poor computing ability. In this method, the positioning result is calculated by the second terminal, which compensates for the defect of poor computing ability of the first terminal.

Figure 7:
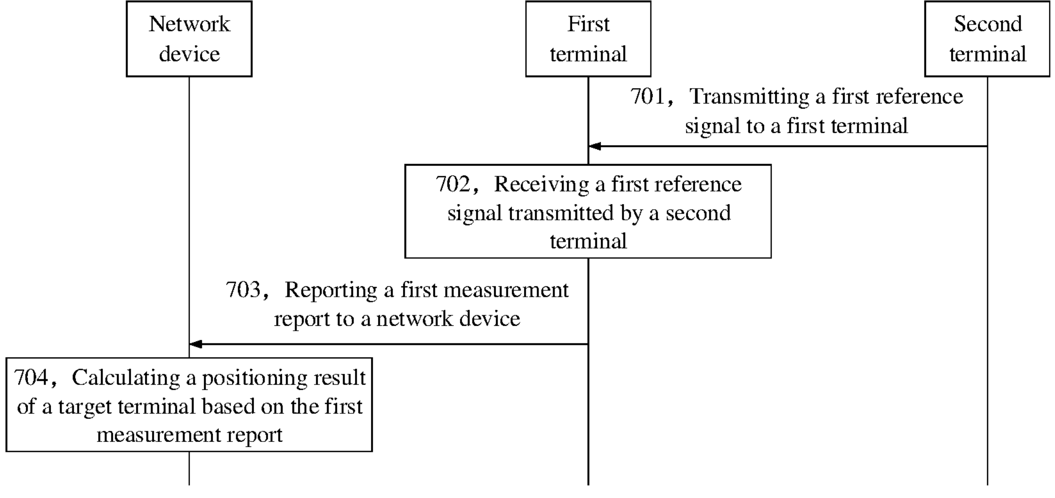
FIG. 7 is a flowchart of a method for positioning a terminal according to an exemplary embodiment.

FIG. 7 is a flowchart of a method for positioning a terminal according to an exemplary embodiment of the present disclosure. The embodiment is exemplified by taking the embodiment being applied to the communication system shown in FIG. 1 as an example. The method includes operations 701 to 704.

In operation 701, a second terminal transmits a first reference signal to a first terminal.

The number of the second terminals is one or more. For example, in a case where a relative location of the first terminal is measured, the number of the second terminals is one. For another example, in a case where a relative distance between the first terminal and the second terminal is measured, the number of the second terminals is one. For another example, in a case where an absolute location of the first terminal is measured, the number of the second terminals is three, and so on. The number of the second terminals is not limited in this embodiment.

The first reference signal is a positioning reference signal for the side link. The first reference signal is a positioning reference signal or a location reference signal that is used on the side link. In other words, the first reference signal is a reference signal used for positioning a target terminal under a SL-based scenario. The first reference signal is used for determining location information of the target terminal and/or distance information of the target terminal. The location information includes an absolute location or a relative location.

Exemplarily, the first reference signal includes at least one of: a SL-PRS, a CSI-RS, a DMRS, a PTRS, a SSB, or a SRS.

Figure 8:
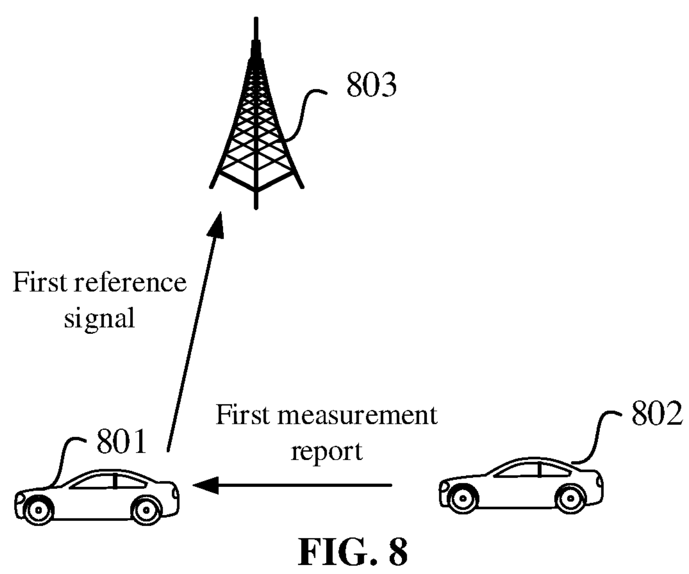
FIG. 8 is a schematic diagram of a method for positioning a terminal according to an exemplary embodiment.

Exemplarily, as shown in FIG. 8, the second terminal 802 transmits a first reference signal to the first terminal 801.

In operation 702, the first terminal receives a first reference signal transmitted by a second terminal.

In a case of multiple second terminals, the second terminal may be understood as multiple terminal entities or understood as multiple antenna units of the same terminal entity.

For example, a certain terminal entity includes two antenna units, and a first reference signal transmitted by one antenna unit is different from a first reference signal transmitted by the other antenna unit. The two antenna units may be understood as two second terminals.

In operation 703, the first terminal reports a first measurement report to a network device.

The first terminal generates a first measurement report based on a measurement result of the first reference signal.

The first measurement report includes the a measurement result of the first reference signal. Optionally, the measurement result of the first reference signal includes at least one of: RSRP/RSRQ of the first reference signal; an angle of arrival of the first reference signal; an angle of departure of the first reference signal; a time stamp of the measurement result; a Rx-Tx time difference; a first reference signal propagation delay; quality for each measurement result; or a time difference of arrival of the first reference signal.

The Rx-Tx time difference includes an Rx-Tx time difference associated with a transmission time of the first reference signal or an Rx-Tx time difference associated with a reception time of the first reference signal.

In operation 704, the network device calculates a positioning result of the target terminal based on the first measurement report.

Optionally, the network device is at least one of a base station or an RSU.

Optionally, the manner for calculating the positioning result of the target terminal includes, but is not limited to, a manner based on at least one of: a TDOA, a SL-TDOA, a SL-AoD, SL-AOA, an E-CID, an AoD, a ToA, a Multi-RTT, or an A-GNSS.

Exemplarily, as shown in FIG. 8, when the manner for calculating the positioning result of the target terminal is a manner based on an angle, after a first terminal 801 receives a first reference signal transmitted by a second terminal 802, the first terminal 801 transmits a first measurement report to a network device 803; the network device 803 may calculate a relative distance and a relative angle between the first terminal 801 and the second terminal 802 based on the first measurement report, to determine positioning information of the first terminal 801 or the second terminal 802.

Optionally, when the manner for calculating the positioning result of the target terminal is a manner based on an angle, the measurement result of the first reference signal obtained by the first terminal includes at least one of the measurement results as shown in Table 5.

TABLE 5

| measurement results of the first reference signal<br>Measurement result |
|---|
| PCI, GCI and TRP ID/RS ID of the measurement |
| UE destination ID, AoA (azimuth and elevation), AOD |
| PRS-RSRP |
| Time stamp of the measurement result |
| Quality for each measurement result |

Exemplarily, taking the manner for calculating the positioning result of the target terminal being a manner based on a time difference as an example, each of the multiple second terminals transmits the first reference signal to the first terminal, and the first terminal obtains the time differences of receiving different first reference signals. After the first terminal transmits the first measurement report to the network device, the terminal device may determine the positioning result of the first terminal or the second terminal based on the time differences included in the first measurement report.

Optionally, when the manner for calculating the positioning result of the target terminal is a manner based on a time difference, the measurement result of first reference signal obtained by the first terminal includes at least one of the measurement results as shown in Table 6.

TABLE 6

| measurement results of the first reference signal<br>Measurement result |
|---|
| Latitude/Longitude/Altitude, together with uncertainty shape |
| PCI, GCI, TRP ID/RS ID, and Destination ID |
| SL RSTD |
| SL-PRS-RSRP |
| Time stamp of the measurement result |
| Time stamp of location estimate |
| Quality for each measurement result |
| Time difference of arrival |

To sum up, according to the method provided by the embodiment, the positioning result is calculated by the network device, it is not necessary for the first terminal or the second terminal to have strong computing ability, and requirements for the first terminal or the second terminal are low. On the other hand, the network device has strong computing ability, therefore, a more accurate positioning result can be obtained.

Figure 9:
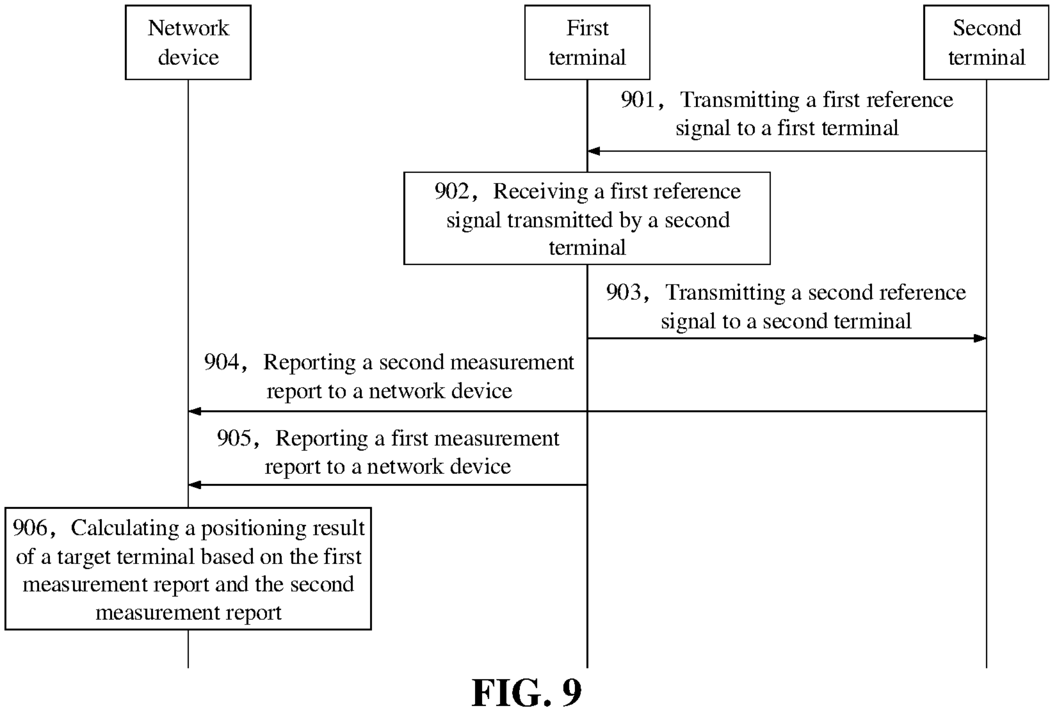
FIG. 9 is a flowchart of a method for positioning a terminal according to an exemplary embodiment.

FIG. 9 is a flowchart of a method for positioning a terminal according to an exemplary embodiment of the present disclosure. The embodiment is exemplified by taking the embodiment being applied to the communication system shown in FIG. 1 as an example. The method includes operations 901 to 906.

In operation 901, a second terminal transmits a first reference signal to a first terminal.

The number of the second terminals is one or more. For example, in a case where a relative location of the first terminal is measured, the number of the second terminals is one. For another example, in a case where a relative distance between the first terminal and the second terminal is measured, the number of the second terminals is one. For another example, in a case where an absolute location of the first terminal is measured, the number of the second terminals is three, and so on. The number of the second terminals is not limited in this embodiment.

The first reference signal is a positioning reference signal for the side link. The first reference signal is a positioning reference signal or a location reference signal that is used on the side link. In other words, the first reference signal is a reference signal used for positioning a target terminal under a SL-based scenario. The first reference signal is used for determining location information of the target terminal and/or distance information of the target terminal. The location information includes an absolute location or a relative location.

Exemplarily, the first reference signal includes at least one of a SL-PRS, a CSI-RS, a DMRS, a PTRS, a SSB, or a SRS.

Figure 10:
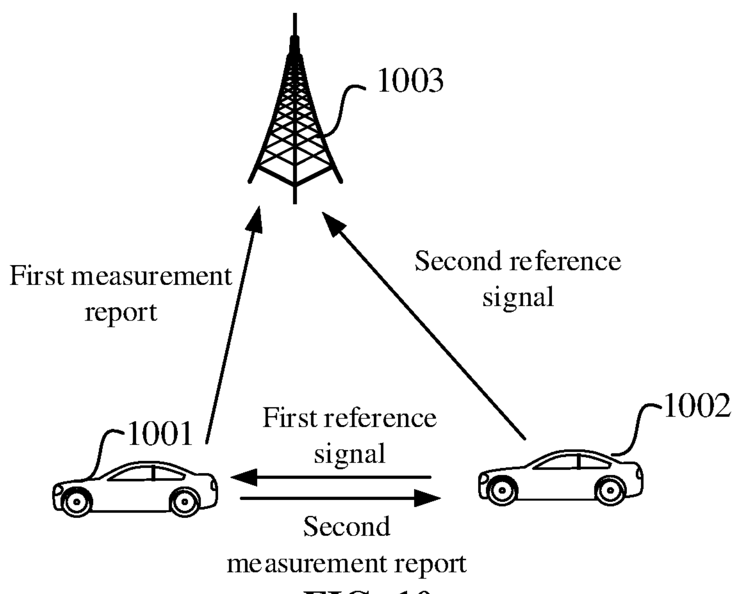
FIG. 10 is a schematic diagram of a method for positioning a terminal according to an exemplary embodiment.

Exemplarily, as shown in FIG. 10, the second terminal 1002 transmits a first reference signal to the first terminal 1001.

In operation 902, the first terminal receives a first reference signal transmitted by a second terminal.

In a case of multiple second terminals, the second terminal may be understood as multiple terminal entities or understood as multiple antenna units of the same terminal entity.

In operation 903, the first terminal transmits a second reference signal to the second terminal.

The second reference signal is a positioning reference signal for the side link. The second reference signal is a positioning reference signal or a location reference signal that is used on the side link. In other words, the second reference signal is a reference signal used for positioning a target terminal under a SL-based scenario. The second reference signal is used for determining location information of the target terminal and/or distance information of the target terminal. The location information includes an absolute location or a relative location.

Exemplarily, the second reference signal includes at least one of: a SL-PRS, a CSI-RS, a DMRS, a PTRS, a SSB, or a SRS.

A type of the second reference signal is identical to or different from a type of the first reference signal.

Exemplarily, as shown in FIG. 10, the first terminal 1001 transmits a second reference signal to the second terminal 1002.

In operation 904, the second terminal reports a second measurement report to a network device.

Optionally, the network device is at least one of: a base station or an RSU.

The second measurement report includes the measurement result of the second reference signal. Optionally, the measurement result of the second reference signal includes at least one of: RSRP/RSRQ of the second reference signal; an angle of arrival of the second reference signal; an angle of departure of the second reference signal; a time stamp of the measurement result; a Rx-Tx time difference; a second reference signal propagation delay; quality for each measurement result; or a time difference of arrival.

The Rx-Tx time difference includes an Rx-Tx time difference associated with a transmission time of the first reference signal or an Rx-Tx time difference associated with a reception time of the first reference signal.

Exemplarily, the second terminal 1002 reports a second measurement report to the network device 1003, as shown in FIG. 10.

In operation 905, the first terminal reports a first measurement report to the network device.

The first measurement report includes a measurement result of the first reference signal. Optionally, the measurement result of the first reference signal includes at least one of: RSRP/RSRQ of the first reference signal; an angle of arrival of the first reference signal; an angle of departure of the first reference signal; a time stamp of the measurement result; a Rx-Tx time difference of the first reference signal; a first reference signal propagation delay; quality for each measurement result; or a time difference of arrival.

The Rx-Tx time difference includes an Rx-Tx time difference associated with a transmission time of the first reference signal or an Rx-Tx time difference associated with a reception time of the first reference signal.

It should be noted that the operation 904 and the operation 905 are performed in any sequence. In the actual implementations, the operation 904 may be implemented firstly, and then the operation 905 may be implemented. Optionally, the operation 905 is implemented firstly, and then the operation 904 is implemented.

For example, as shown in FIG. 10, the first terminal 1001 reports the first measurement report to the network device 1003 and the second terminal 1002 reports the second measurement report to the network device 1003.

In operation 906, the network device calculates a positioning result of a target terminal based on the first measurement report and the second measurement report.

The target terminal is at least one of the first terminal or the second terminal.

It should be noted that the number of the first terminals is one or more, and the number of the second terminals is also one or more. In specific implementations, the number of the first terminals may be one and the number of the second terminals may be multiple. Optionally, the number of the first terminals may be multiple and the number of the second terminals may be one. Optionally, the number of the first terminals may be multiple and the number of the second terminals may be multiple. Optionally, the number of the first terminals may be one and the number of the second terminals may be one. The foregoing cases are not intended to limit the present disclosure and in particular implementations, those skilled in the art may change or modify the embodiment according to the actual number of terminals.

Optionally, the manner for calculating the positioning result of the target terminal includes, but is not limited to, a manner based on at least one of: a TDOA, a SL-TDOA, a SL-AoD, a SL-AOA, an E-CID, an AoD, a ToA, a Multi-RTT, or an A-GNSS.

Optionally, the first reference signal cannot conflict with the second reference signal in the time domain in order to ensure the successful transmission and reception of the first reference signal and/or the second reference signal.

For example, as shown in FIG. 10, in an example in which the manner for calculating the positioning result of the target terminal is a manner based on a Rx-Tx time difference, the first terminal 1001 receives the first reference signal transmitted by the second terminal 1002, and the second terminal 1002 receives the second reference signal transmitted by the first terminal 1001. Since the Rx-Tx time difference exists for the first reference signal and the second reference signal, and the first measurement report includes the time difference between the transmission time of the second reference signal and the reception time of the first reference signal, and the second measurement report includes the time difference between the transmission time of the first reference signal and the reception time of the second reference signal, then the network device 1003 calculates the positioning result of the first terminal 1001 and/or the positioning result of the second terminal 1002 based on the first measurement report and the second measurement report.

Exemplarily, when the first terminal includes multiple terminals and the second terminal includes one terminal, the second terminal transmits a first reference signal to the multiple first terminals. After the multiple first terminals receive the first reference signals transmitted by the second terminal, each first terminal sends a second reference signal to the second terminal and reports a first measurement report to the network device. After the second terminal receives the multiple second reference signals transmitted by the multiple first terminals, the second terminal reports a second measurement report corresponding to the second reference signals to the network device, and the network device calculates positioning results of the multiple first terminals and/or a positioning result of one second terminal based on the first measurement reports and the second measurement reports.

Exemplarily, when the first terminal includes one terminal and the second terminal includes multiple terminals, the multiple second terminals send a first reference signal to the first terminal. After the first terminal receives the multiple first reference signals transmitted by the multiple second terminals, the first terminal transmits a second reference signal to each second terminal, and reports a first measurement report to the network device. After each second terminal receives the second reference signal transmitted by the first terminal, the second terminal reports a second measurement report to the network device. The network device calculates a positioning result of one first terminal and/or multiple positioning results of the multiple second terminals based on the first measurement report and the second measurement reports.

Optionally, when the manner for calculating the positioning result of the target terminal is a manner based on a time difference, the measurement result of the first reference signal obtained by the first terminal and/or the measurement result of the second reference signal obtained by the second terminal includes at least one of the measurement results as shown in Table 7.

TABLE 7

| measurement results of the first reference signal and/or measurement results of the second reference signal Measurement result |
|---|
| PCI, GCI, and TRP ID of the measurement |
| Rx-Tx time difference |
| PRS-RSRP |
| AoA (azimuth and elevation) |
| Time stamp of the measurement result |
| Quality of each measurement result |

To sum up, according to the method provided by the embodiment, the positioning result is calculated by the network device, it is not necessary for the first terminal or the second terminal to have strong computing ability, and requirements for the first terminal or the second terminal are low. On the other hand, the network device has strong computing ability, therefore, a more accurate positioning result can be obtained.

Figure 11:
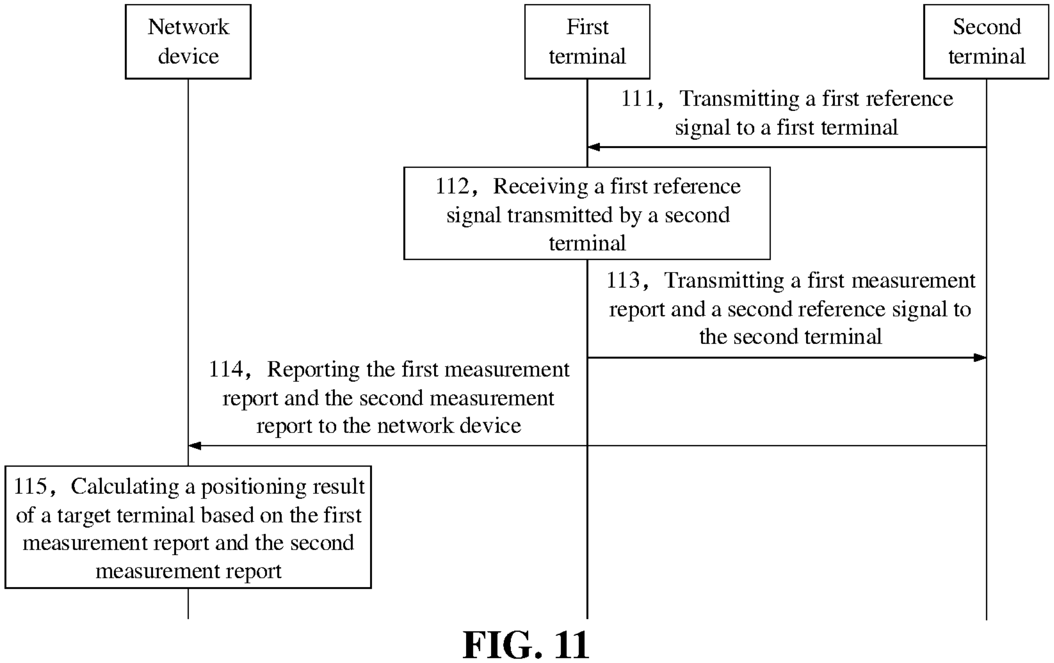
FIG. 11 is a flowchart of a method for positioning a terminal according to an exemplary embodiment.

FIG. 11 is a flowchart of a method for positioning a terminal according to an exemplary embodiment of the present disclosure. The embodiment is exemplified by taking the embodiment being applied to the communication system shown in FIG. 1 as an example. The method includes operations 111 to 115.

In operation 111, a second terminal transmits a first reference signal to a first terminal.

The first reference signal is a positioning reference signal for the side link. The first reference signal is a positioning reference signal or a location reference signal that is used on the side link. In other words, the first reference signal is a reference signal used for positioning a target terminal under a SL-based scenario. The first reference signal is used for determining location information of the target terminal and/or distance information of the target terminal. The location information includes an absolute location or a relative location.

Exemplarily, the first reference signal includes at least one of a SL-PRS, a CSI-RS, a DMRS, a PTRS, a SSB, or a SRS.

Figures 12, 13:
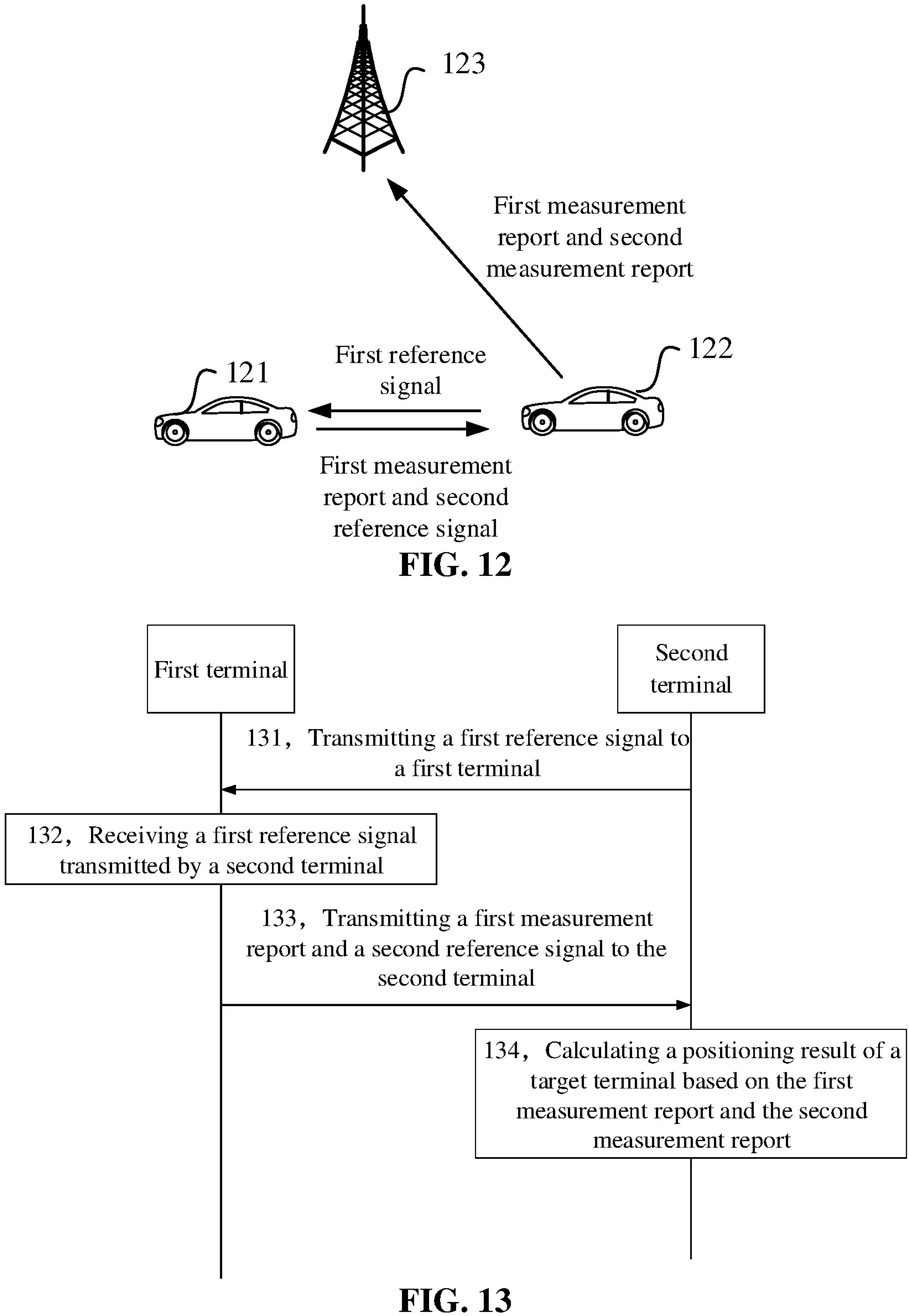
FIG. 12 is a schematic diagram of a method for positioning a terminal according to an exemplary embodiment.
FIG. 13 is a flowchart of a method for positioning a terminal according to an exemplary embodiment.

Exemplarily, as shown in FIG. 12, the second terminal 122 transmits a first reference signal to the first terminal 121.

In operation 112, the first terminal receives a first reference signal transmitted by a second terminal.

In a case of multiple second terminals, the second terminal may be understood as multiple terminal entities or understood as multiple antenna units of the same terminal entity.

In operation 113, the first terminal transmits a first measurement report and a second reference signal to the second terminal.

The first measurement report includes the a measurement result of the first reference signal. Optionally, the measurement result of the first reference signal includes at least one of: RSRP/RSRQ of the first reference signal; an angle of arrival of the first reference signal; an angle of departure of the first reference signal; a time stamp of the measurement result; a Rx-Tx time difference; a first reference signal propagation delay; quality for each measurement result; or a time difference of arrival.

The Rx-Tx time difference includes an Rx-Tx time difference associated with a transmission time of the first reference signal or an Rx-Tx time difference associated with a reception time of the first reference signal.

Schematically, the second reference signal is a positioning reference signal or a location reference signal that is used on the side link. In other words, the second reference signal is a reference signal used for positioning a target terminal under a SL-based scenario. The second reference signal is used for determining location information of the target terminal and/or distance information of the target terminal. The location information includes an absolute location or a relative location.

Exemplarily, the second reference signal includes at least one of: a SL-PRS, a CSI-RS, a DMRS, a PTRS, a SSB, or a SRS.

A type of the second reference signal is identical to or different from a type of the first reference signal.

It should be noted that the first measurement report and the second reference signal are transmitted simultaneously; or the transmission time of the first measurement report is different from the transmission time of the second reference signal.

Exemplarily, as shown in FIG. 12, the first terminal 121 transmits the first measurement report and the second reference signal to the second terminal 122.

In operation 114, the second terminal reports the first measurement report and the second measurement report to a network device.

Optionally, the network device is at least one of: a base station or an RSU.

The second measurement report includes the measurement result of the second reference signal. Optionally, the measurement result of the second reference signal includes at least one of: RSRP/RSRQ of the second reference signal; an angle of arrival of the second reference signal; an angle of departure of the second reference signal; a time stamp of the measurement result; a Rx-Tx time difference; a second reference signal propagation delay; quality for each measurement result; or a time difference of arrival.

The Rx-Tx time difference includes an Rx-Tx time difference associated with a transmission time of the second reference signal or an Rx-Tx time difference associated with a reception time of the second reference signal. Exemplarily, the second terminal 122 reports the first measurement report and the second measurement report to the network device 123.

In operation 115, the network device calculates a positioning result of a target terminal based on the first measurement report and the second measurement report.

Optionally, the manner for calculating the positioning result of the target terminal includes, but is not limited to, a manner based on at least one of: a TDOA, a SL-TDOA, a SL-AoD, an E-CID, an AoD, a ToA, a Multi-RTT, or an A-GNSS.

The target terminal is at least one of the first terminal or the second terminal.

It should be noted that the number of the first terminals is one or more, and the number of the second terminals is also one or more. In the specific implementation, the number of the first terminals may be one and the number of the second terminals may be multiple. Optionally, the number of the first terminals may be multiple and the number of the second terminals may be one. Optionally, the number of the first terminals may be multiple and the number of the second terminals may be multiple. Optionally, the number of the first terminals may be one and the number of the second terminals may be one. The foregoing cases are not intended to limit the present disclosure and in particular implementations, those skilled in the art may modify or change the embodiment according to the actual number of terminals.

Optionally, the first reference signal cannot conflict with the second reference signal in the time domain in order to ensure the successful transmission and reception of the first reference signal and/or the second reference signal.

Exemplarily, when the first terminal includes multiple terminals and the second terminal includes one terminal, the second terminal transmits a first reference signal to the multiple first terminals. After each first terminal receives the first reference signal transmitted by the second terminal, each first terminal sends a second reference signal and a first measurement report to the second terminal. After the second terminal receives multiple second reference signals and multiple first measurement reports transmitted by the multiple first terminals, the second terminal reports second measurement reports corresponding to the second reference signals and the multiple received first measurement reports to the network device, and the network device calculates positioning results of the multiple first terminals and/or a positioning result of one second terminal based on the first measurement reports and the second measurement reports.

Exemplarily, when the first terminal includes one terminal and the second terminal includes multiple terminals, each of the multiple second terminals sends a first reference signal to the first terminal. After the first terminal receives the multiple first reference signals transmitted by the multiple second terminals, the first terminal transmits a second reference signal and a first measurement report to each second terminal. After each second terminal receives the second reference signal transmitted by the first terminal, each second terminal reports the first measurement report and the second measurement report to the network device. The network device calculates the positioning result of the first terminal and/or the positioning results of the multiple second terminals based on the first measurement reports and the second measurement reports.

Exemplarily, as shown in FIG. 12, taking the manner for calculating the positioning result of the target terminal is a manner based on a Rx-Tx time difference as an example, the first terminal 121 receives the first reference signal transmitted by the second terminal 122, and the second terminal 122 receives the second reference signal and the first measurement report transmitted by the first terminal 121. Because, there is an Rx-Tx time difference for the first reference signal and the second reference signal, the first measurement report includes the time difference between the transmission time of the second reference signal and the reception time of the first reference signal, and the second measurement report includes the time difference between the transmission time of the first reference signal and the reception time of the second reference signal. The network device 123 calculates the positioning result of the first terminal 121 and/or the positioning result of the second terminal 122 based on the first measurement report and the second measurement report.

Optionally, when the manner for calculating the positioning result of the target terminal is a manner based on a time difference, the measurement result of each first reference signal obtained by the first terminal and/or the measurement result of each second reference signal obtained by the second terminal includes at least one of the measurement results as shown in Table 8.

TABLE 8

| measurement results of the first reference signal and/or measurement results of the second reference signal Measurement result |
|---|
| PCI, GCI, and TRP ID/RS ID of the measurement result |
| Rx-Tx time difference |
| PRS-RSRP |
| AoA (azimuth and elevation) |
| Time stamp of the measurement result |
| Quality of each measurement result |

To sum up, according to the method provided by the embodiment, the positioning result is calculated by the network device, it is not necessary for the first terminal or the second terminal to have strong computing ability, and requirements for the first terminal or the second terminal are low. On the other hand, the network device has strong computing ability, and a more accurate positioning result can be obtained.

Moreover, in the vehicle to everything (V2X) scenario, the whole positioning process requires two vehicles to interact with each other on the side link, without the access of other vehicles, which can also save resources of the side channel.

FIG. 13 is a method for positioning a terminal according to an exemplary embodiment of the present disclosure. The embodiment is exemplified by taking the embodiment being applied to the communication system shown in FIG. 1 as an example. The method includes operations 131 to 134.

In operation 131, a second terminal transmits a first reference signal to a first terminal.

The number of the second terminals is one or more. For example, in a case where a relative location of the first terminal is measured, the number of the second terminals is one. For another example, in a case where a relative distance between the first terminal and the second terminal is measured, the number of the second terminals is one. For another example, in a case where an absolute location of the first terminal is measured, the number of the second terminals is three, and so on. The number of the second terminals is not limited in this embodiment.

The first reference signal is a positioning reference signal for the side link. The first reference signal is a positioning reference signal or a location reference signal that is used on the side link. In other words, the first reference signal is a reference signal used for positioning a target terminal under a SL-based scenario. The first reference signal is used for determining location information of the target terminal and/or distance information of the target terminal. The location information includes an absolute location or a relative location.

Exemplarily, the first reference signal includes at least one of a SL-PRS, a CSI-RS, a DMRS, a PTRS, a SSB, or a SRS.

Figures 14, 15:
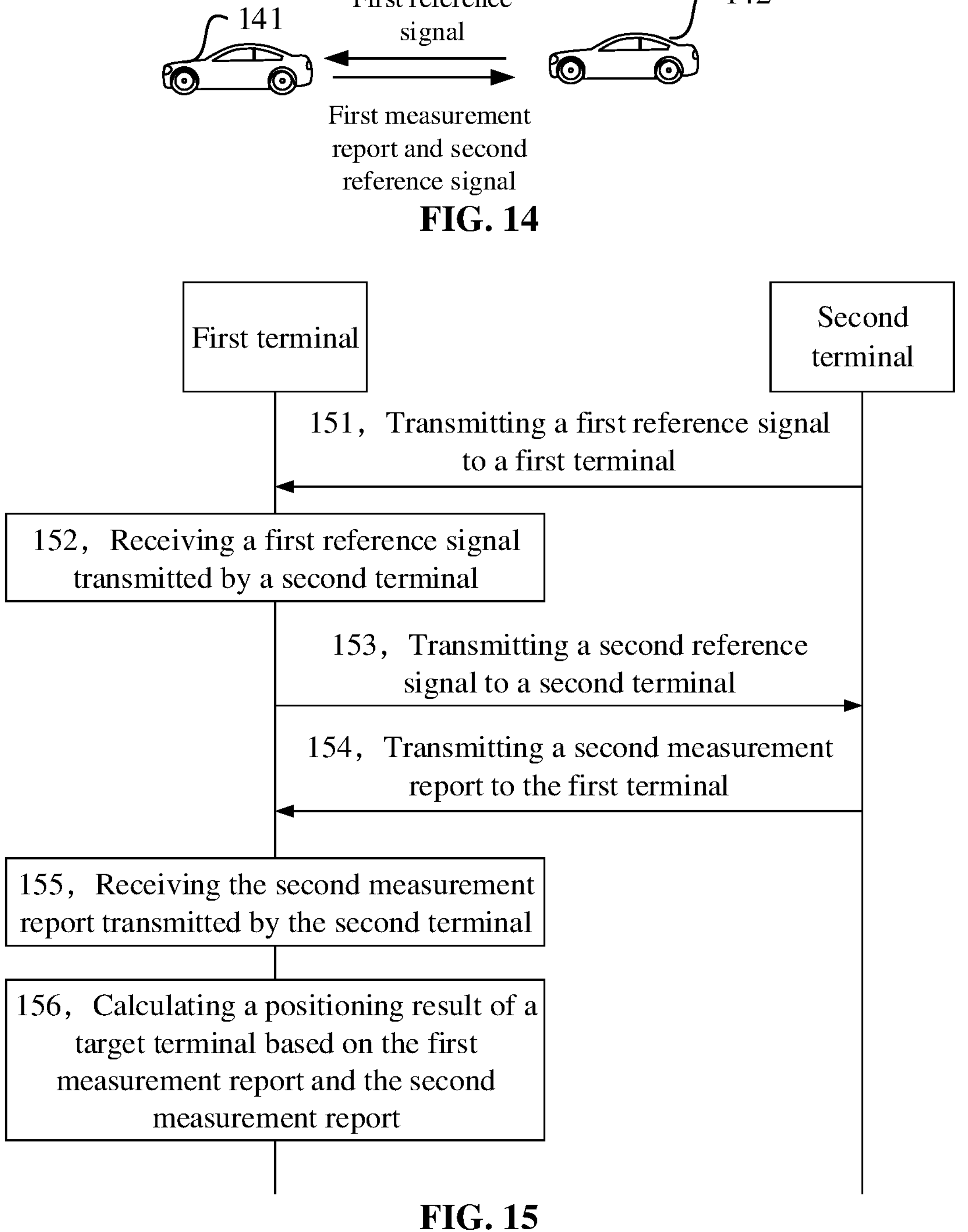
FIG. 14 is a schematic diagram of a method for positioning a terminal according to an exemplary embodiment.
FIG. 15 is a flowchart of a method for positioning a terminal according to an exemplary embodiment.

Exemplarily, as shown in FIG. 14, the second terminal 142 transmits a first reference signal to the first terminal 141.

In operation 132, the first terminal receives a first reference signal transmitted by a second terminal.

In a case of multiple second terminals, the second terminal may be understood as multiple terminal entities or understood as multiple antenna units of the same terminal entity.

In operation 133, the first terminal transmits a first measurement report and a second reference signal to the second terminal.

The first measurement report includes a measurement result of the first reference signal. Optionally, the measurement result of the first reference signal includes at least one of: RSRP/RSRQ of the first reference signal; an angle of arrival of the first reference signal; an angle of departure of the first reference signal; a time stamp of the measurement result; a Rx-Tx time difference; a first reference signal propagation delay; quality for each measurement result; or a time difference of arrival.

The Rx-Tx time difference includes an Rx-Tx time difference associated with a transmission time of the first reference signal or an Rx-Tx time difference associated with a reception time of the first reference signal.

The second reference signal is a positioning reference signal for the side link. Optionally, the second reference signal is used for determining at least one of location information or distance information of a target terminal. The location information includes at least one of an absolute location or a relative location. Optionally, the second reference signal is at least one of: a SL-PRS, a CSI-RS, a DMRS, a PTRS, a SSB, or a SRS.

Exemplarily, as shown in FIG. 14, the first terminal 141 transmits a first measurement report and a second reference signal to the second terminal 142.

In operation 134, the second terminal calculates a positioning result of a target terminal based on the first measurement report and the second measurement report.

The second measurement report includes the measurement result of the second reference signal. Optionally, the measurement result of the second reference signal includes at least one of: RSRP/RSRQ of the second reference signal; an angle of arrival of the second reference signal; an angle of departure of the second reference signal; a time stamp of the measurement result; a Rx-Tx time difference; a second reference signal propagation delay; quality for each measurement result; or a time difference of arrival.

The Rx-Tx time difference includes an Rx-Tx time difference associated with a transmission time of the first reference signal or an Rx-Tx time difference associated with a reception time of the first reference signal.

Optionally, the manner for calculating the positioning result of the target terminal includes, but is not limited to, a manner based on at least one of: a TDOA, a SL-TDOA, a SL-AoD, an E-CID, an AoA, an AoD, a ToA, a Multi-RTT, or an A-GNSS.

The target terminal is at least one of the first terminal or the second terminal.

It should be noted that the number of the first terminals is one or more, and number of the second terminals is also one or more. In the specific implementation, the number of the first terminals may be one and the number of the second terminals may be multiple. Optionally, the number of the first terminals may be multiple and the number of the second terminals may be one. Optionally, the number of the first terminals may be multiple and the number of the second terminals may be multiple. Optionally, the number of the first terminals may be one and the number of the second terminals may be one. The foregoing cases are not intended to limit the present disclosure and in particular implementations, those skilled in the art may change or modify the embodiment according to the actual number of terminals.

Optionally, the first reference signal cannot conflict with the second reference signal in the time domain in order to ensure the successful transmission and reception of the first reference signal and/or the second reference signal.

For example, as shown in FIG. 14, in an example in which a manner for calculating the positioning result of the target terminal is a manner based on Rx-Tx time difference, the first terminal 141 receives the first reference signal transmitted by the second terminal 142, and the second terminal 142 receives the second reference signal and the first measurement report transmitted by the first terminal 141. Since the Rx-Tx time difference exists for the first reference signal and the second reference signal, the first measurement report includes the Rx-Tx time difference of the first reference signal, and the second measurement report includes the Rx-Tx time difference of the second reference signal, then the second terminal 142 calculates the positioning result of the first terminal 141 and/or the positioning result of the second terminal 142 based on the first measurement report and the second measurement report.

Exemplarily, when the first terminal includes multiple terminals and the second terminal includes one terminal, the second terminal transmits a first reference signal to the multiple first terminals. After the multiple first terminals receive the first reference signals transmitted by the second terminal, each first terminal sends a second reference signal and a first measurement report to the second terminal. After the second terminal receives the multiple second reference signals and first measurement reports transmitted by the multiple first terminals, the second terminal calculates positioning results of the multiple first terminals and/or a positioning result of the second terminal based on the first measurement reports and the second measurement reports.

Exemplarily, when the first terminal includes one terminal and the second terminal includes multiple terminals, each of the multiple second terminals send a first reference signal to the first terminal. After the first terminal receives the multiple first reference signals transmitted by the multiple second terminals, the first terminal transmits a second reference signal to each second terminal, and reports one or more first measurement reports to the network device. After each second terminal receives the second reference signal transmitted by the first terminal, the second terminal calculates a positioning result of the first terminal and/or multiple positioning results of the multiple second terminals based on the first measurement reports and the second measurement reports.

Optionally, when the manner for calculating the positioning result of the target terminal is a manner based on a time difference, the measurement result of each first reference signal obtained by the first terminal and/or the measurement result of the second reference signal obtained by the second terminal includes at least one of the measurement results as shown in Table 9.

TABLE 9

| measurement results of the first reference signal and/or measurement results of the second reference signal Measurement results from the terminal configured with the reference signal |
|---|
| PCI, GCI and TRP ID for the measurement result |
| Rx-Tx time difference |
| PRS-RSRP |
| AoA (azimuth and elevation) |
| Time stamp of the measurement result |
| Quality of each measurement result |

To sum up, according to the method provided by the embodiment, the positioning of the target terminal is implemented through the side link, and it does not need to consume the resources of the network device, which can reduce the operation cost of the network device. On the other hand, it does not need to report data to the network device during the calculation, which can save the resources of the uplink channel and the downlink channel, as well as the resources of the side link. In addition, since the calculation of the positioning result is implemented by the second terminal, it is not necessary for the first terminal to have strong computing ability, and the requirements for the first terminal are low.

FIG. 15 is a flowchart of a method for positioning a terminal according to an exemplary embodiment of the present disclosure. The embodiment is exemplified by taking the embodiment being applied to the communication system shown in FIG. 1 as an example. The method includes operations 151 to 156.

In operation 151, a second terminal transmits a first reference signal to a first terminal.

The number of the second terminals is one or more.

The first reference signal is a positioning reference signal for the side link. The first reference signal is a positioning reference signal or a location reference signal that is used on the side link. In other words, the first reference signal is a reference signal used for positioning a target terminal under a SL-based scenario. The first reference signal is used for determining location information of the target terminal and/or distance information of the target terminal. The location information includes an absolute location or a relative location.

Exemplarily, the first reference signal includes at least one of: a SL-PRS, a CSI-RS, a DMRS, a PTRS, a SSB, or a SRS.

Exemplarily, as shown in FIG. 16, the second terminal 162 transmits a first reference signal to the first terminal 161.

In operation 152, the first terminal receives a first reference signal transmitted by a second terminal.

In a case of multiple second terminals, the second terminal may be understood as multiple terminal entities or understood as multiple antenna units of the same terminal entity.

In operation 153, the first terminal transmits a second reference signal to a second terminal.

The second reference signal is a positioning reference signal for the side link.

In operation 154, the second terminal transmits a second measurement report to the first terminal.

The second measurement report includes the measurement result of the second reference signal. Optionally, the measurement result of the second reference signal includes at least one of: RSRP/RSRQ of the second reference signal; an angle of arrival of the second reference signal; an angle of departure of the second reference signal; a time stamp of the measurement result; a Rx-Tx time difference; a second reference signal propagation delay; quality for each measurement result; or a time difference of arrival.

The Rx-Tx time difference includes an Rx-Tx time difference associated with a transmission time of the first reference signal or an Rx-Tx time difference associated with a reception time of the first reference signal.

In operation 155, the first terminal receives the second measurement report transmitted by the second terminal.

In operation 156, the first terminal calculates a positioning result of a target terminal based on the first measurement report and the second measurement report.

The first measurement report includes the measurement result of the first reference signal. Optionally, the measurement result of the first reference signal includes at least one of: RSRP/RSRQ of the first reference signal; an angle of arrival of the first reference signal; an angle of departure of the first reference signal; a time stamp of the measurement result; a Rx-Tx time difference; a first reference signal propagation delay; quality for each measurement result; or a time difference of arrival.

The Rx-Tx time difference includes an Rx-Tx time difference associated with a transmission time of the first reference signal or an Rx-Tx time difference associated with a reception time of the first reference signal.

It should be noted that the number of the first terminals is one or more, and number of the second terminals is also one or more. In the specific implementation, the number of the first terminals may be one and the number of the second terminals may be multiple. Optionally, the number of the first terminals may be multiple and the number of the second terminals may be one. Optionally, the number of the first terminals may be multiple and the number of the second terminals may be multiple. Optionally, the number of the first terminals may be one and the number of the second terminals may be one. The foregoing cases are not intended to limit the present disclosure and in particular implementations, those skilled in the art may modify or change the embodiment according to the actual number of terminals.

Optionally, the first reference signal cannot conflict with the second reference signal in the time domain in order to ensure the successful transmission and reception of the first reference signal and/or the second reference signal.

Optionally, the manner for calculating the positioning result of the target terminal includes, but is not limited to, a manner based on at least one of: a TDOA, a SL-TDOA, a SL-AoD, an E-CID, an AoD, a ToA, a Multi-RTT, or an A-GNSS.

The target terminal is at least one of the first terminal or the second terminal.

Exemplarily, as shown in FIG. 16, in an example in which the manner for calculating the positioning result of the target terminal is a manner based on Rx-Tx time difference, the first terminal 161 receives the first reference signal transmitted by the second terminal 162; the second terminal 162 receives the second reference signal and the first measurement report transmitted by the first terminal 161; and then the second terminal 162 returns the second measurement report to the first terminal 161. Since there is an Rx-Tx time difference for the first reference signal and the second reference signal, the first measurement report includes the Rx-Tx time difference of the first reference signal. The second measurement report includes the Rx-Tx time difference of the second reference signal. The first terminal 161 calculates the positioning result of the first terminal 161 and/or the positioning result of the second terminal 162 based on the first measurement report and the second measurement report.

Exemplarily, when the first terminal includes multiple terminals and the second terminal includes one terminal, the second terminal transmits a first reference signal to the multiple first terminals. After each first terminal receives the first reference signal transmitted by the second terminal, each first terminal sends a second reference signal to the second terminal. After the second terminal receives the multiple second reference signals transmitted by the multiple first terminals, the second terminal transmits a second measurement report to one or more corresponding first terminals according to the second reference signals, and the first terminals calculate positioning results of the multiple first terminals and/or a positioning result of the second terminal based on the first measurement reports and the second measurement reports.

Exemplarily, when the first terminal includes one terminal and the second terminal includes multiple terminals, each of the multiple second terminals send a first reference signal to the first terminal. After the first terminal receives the multiple first reference signals transmitted by the multiple second terminals, the first terminal transmits a second reference signal to each second terminal. After each second terminal receives the second reference signal transmitted by the first terminal, each second terminal sends a second measurement report to the first terminal. The first terminal calculates a positioning result of the first terminal and/or the multiple positioning results of the second terminals based on the first measurement reports and the second measurement reports.

Optionally, when the manner for calculating the positioning result of the target terminal is a manner based on a time difference, the measurement result of the first reference signal obtained by the first terminal and/or the measurement result of the second reference signal obtained by the second terminal includes at least one of the measurement results as shown in Table 10.

TABLE 10

| measurement results of the first reference signal and/or measurement results of the second reference signal. Measurement results from the terminal configured with the reference signal |
|---|
| PCI, GCI, and TRP ID/RS ID of the measurement result |
| Rx-Tx time difference |
| PRS-RSRP |
| AoA (azimuth and elevation) |
| Time stamp of the measurement result |
| Quality of each measurement result |

To sum up, according to the method provided by the embodiment, the positioning of the target terminal is implemented through the side link, it does not need to consume the resources of the network device, which can reduce the operation cost of the network device. On the other hand, it does not need to report data to the network device during the calculation, which can save the resources of the uplink channel and the downlink channel, and can ensure the better real-time performance of the calculation.

Moreover, in the vehicle to everything (V2X) scenario, only two vehicles are required to obtain the positioning result, without the access of other vehicles, which can also save resources of the side channel. In addition, since the calculation of the positioning result is implemented by the first terminal, it is not necessary for the second terminal to have strong computing ability, thereby the requirements for the second terminal being low and obtaining better real-time performance.

The above embodiments may be combined with the embodiments shown below in FIG. 17 and FIG. 18. FIG. 17 is a flowchart of a method for configuring a reference signal according to an exemplary embodiment of the present disclosure. The embodiment is exemplified by taking the embodiment being applied to the communication system shown in FIG. 1 as an example. The method includes operation 171.

In operation 171, a first terminal and/or a second terminal generates configuration information of a first reference signal.

Optionally, the configuration information of the first reference signal includes at least one of: a number of receiving or transmitting terminals for the first reference signal; information of receiving or transmitting terminals for the first reference signal; a type of the first reference signal; or a measurement interval of the first reference signal.

The measurement interval of the first reference signal is transmitted by the network device; or, the measurement interval of the first reference signal is configured by the network device upon receiving a request from the first terminal and/or the second terminal.

Optionally, the type of the first reference signal includes at least one of: a periodic signal, an aperiodic signal, or a semi-persistent signal.

For example, information of the receiving terminal is an ID (which can be a UE ID, such as a Layer-2 ID, or a destination ID) of a target terminal. The information of the transmitting terminal is an ID (which may be a UE ID, such as a Layer-2 ID or a destination ID) of the terminal transmitting the reference signal.

Optionally, the configuration information of the first reference signal may further include at least one of: a start time of PRS transmission; an end time of PRS transmission; a PRS resource bandwidth; PRS resource set IDs; PRS resource IDs; PRS transmission period and offset; PRS resource repetition factor; a number of PRS symbols per PRS resource; PRS muting patterns; a number of PRS resources per PRS resource set; a number or indication of frequency layers; a beam direction; a Comb size, a start PRB and a Point A of PRS; a start indication or an end indication of PRS.

Optionally, the configuration information of the first reference signal may further include: beam information associated with the first reference signal. The beam information is at least one of: a single side band (SSB), a channel state information reference signal (CSIRS), and a PRS.

Similarly, the first terminal and/or the second terminal generate configuration information of the second reference signal. For example, the first terminal and the second terminal generate the configuration information of the second reference signal according to a generation strategy same as the generation strategy for generating the configuration information of the first reference signal.

Optionally, the configuration information of the second reference signal includes at least one of: a number of receiving or transmitting terminals for the second reference signal; information of receiving or transmitting terminals for the second reference signal; a type of the second reference signal; or a measurement interval of the second reference signal.

The measurement interval of the second reference signal is transmitted by the network device; or, the measurement interval of the second reference signal is configured by the network device upon receiving a request from the first terminal and/or the second terminal.

Optionally, the type of the second reference signal includes at least one of: a periodic signal, an aperiodic signal, or a semi-persistent signal.

For example, information of the receiving terminal is an ID (which can be a UE ID, such as a Layer-2 ID, or a destination ID) of a target terminal. The information of the transmitting terminal is an ID (which may be a UE ID, such as a Layer-2 ID or a destination ID) of the terminal transmitting the reference signal.

Optionally, the configuration information of the second reference signal may further include at least one of: a start time of PRS transmission; an end time of PRS transmission; a PRS resource bandwidth; PRS resource set IDs; PRS resource IDs; a PRS transmission period and offset; a PRS resource repetition factor; a number of PRS symbols per PRS resource; PRS muting patterns; a number of PRS resources per PRS resource set; a number or indication of frequency layers; a beam direction; a Comb size, a start PRB and a Point A of PRS; a start indication or an end indication of PRS.

Optionally, the configuration information of the second reference signal may further include beam information associated with the second reference signal. The beam information is at least one of a SSB, a CSIRS, or a PRS.

To sum up, the first terminal configures the reference signal for positioning for side link through receiving the first information. According to the scheme above, the reference signal for positioning is configured through the first information, which can implement more accurate regulation and controlling of the reference signal, and further makes the positioning of the target terminal and the terminal based on the reference signal to be more flexible and controllable.

FIG. 18 is a flowchart of a method for configuring a reference signal according to an exemplary embodiment of the present disclosure. The embodiment is exemplified by taking the embodiment being applied to the communication system shown in FIG. 1 as an example. The method includes operation 181.

In operation 181, a first terminal and/or a second terminal receives first information including configuration information of a first reference signal.

Optionally, configuration information of the first reference signal includes at least one of: a number of receiving or transmitting terminals for the first reference signal; information of receiving or transmitting terminals for the first reference signal; a type of the first reference signal; or a measurement interval of the first reference signal.

The measurement interval of the first reference signal is transmitted by the network device; or, the measurement interval of the first reference signal is configured by the network device upon receiving a request from the first terminal and/or the second terminal.

Optionally, the type of the first reference signal includes at least one of: a periodic signal, an aperiodic signal, or a semi-persistent signal.

For example, information of the receiving terminal is an ID (which can be a UE ID, such as a Layer-2 ID, or a destination ID) of a target terminal. The information of the transmitting terminal is an ID (which may be a UE ID, such as a Layer-2 ID or a destination ID) of a terminal transmitting the reference signal.

Optionally, the configuration information of the first reference signal may further include at least one of: a start time of a first reference signal transmission; an end time of a first reference signal transmission; a first reference signal resource bandwidth; first reference signal resource set IDs; first reference signal resource IDs; a first reference signal transmission period and offset; a first reference signal resource repetition factor; a number of first reference signal symbols per first reference signal resource; first reference signal muting patterns; a number of first reference signal resources per a first reference signal resource set; a number or indication of frequency layers; a beam direction; a Comb size, a start PRB and a Point A of first reference signals; a start indication or an end indication of first reference signals.

In a case where the first terminal receives the first information, the first information is transmitted by the LMF or the network device or the second terminal. In a case where the second terminal receives the first information, the first information is transmitted by the LMF or the network device or the first terminal.

Optionally, the configuration information of the first reference signal may further include beam information associated with the first reference signal. The beam information is at least one of a SSB, a CSIRS, or a PRS.

Similarly, the first terminal/second terminal receives second information including configuration information of the second reference signal.

Optionally, the configuration information of the second reference signal includes at least one of: a number of receiving or transmitting terminals for the second reference signal; information of receiving or transmitting terminals for the second reference signal; a type of the second reference signal; or a measurement interval of the second reference signal.

The measurement interval of the second reference signal is transmitted by the network device; or, the measurement interval of the second reference signal is configured by the network device upon receiving a request from the first terminal and/or the second terminal.

Optionally, the type of the second reference signal includes at least one of: a periodic signal, an aperiodic signal, or a semi-persistent signal.

For example, information of the receiving terminal is an ID (which can be a UE ID, such as a Layer-2 ID, or a destination ID) of a target terminal. The information of the transmitting terminal is an ID (which may be a UE ID, such as a Layer-2 ID or a destination ID) of a terminal transmitting the reference signal.

Optionally, the configuration information of the second reference signal may further include at least one of: a start time of a second reference signal transmission; an end time of a second reference signal transmission; a second reference signal resource bandwidth; second reference signal resource set IDs; second reference signal resource IDs; a second reference signal transmission period and offset; a second reference signal resource repetition factor; number of second reference signal symbols per second reference signal resource; second reference signal muting patterns; a number of second reference signal resources per second reference signal resource set; a number or indication of frequency layers; a beam direction; a Comb size, a start PRB and Point A of second reference signals; a start indication or an end indication of second reference signals.

Optionally, the configuration information of the second reference signal may further include beam information associated with the second reference signal. The beam information is at least one of a SSB, a CSIRS, or a PRS.

In a case where the configuration information is transmitted by the LMF, the first information is transmitted through the LTE positioning protocol (LPP).

In a case where the configuration information is transmitted by the network device, the first information is carried in at least one of: a radio resource control (RRC) message, a media access control control element (MAC CE), a downlink control information (DCI), or pre-configured information;

In a case where the configuration information is transmitted by the terminal, the first information is carried in at least one of: a PC5-S message, a PC5-RRC message, a MAC CE, or side link control information (SCI).

FIG. 19 shows a block diagram of a device for positioning a terminal according to an exemplary embodiment of the present disclosure. The device 190 includes a first receiving module 191.

The first receiving module 191 is configured to receive a first reference signal transmitted by a second terminal, where a first reference signal is a positioning reference signal for a side link and the first reference signal is used for positioning a target terminal.

In an optional design of the present disclosure, the device further includes: a first positioning module 192, configured to calculate a positioning result of the target terminal based on a measurement result of the first reference signal, where the target terminal is at least one of the device or the second terminal.

In an optional design of the present disclosure, the device further includes: a first transmitting module 193. The first transmitting module 193 is configured to transmit a first measurement report to the second terminal, where the first measurement report is used by the second terminal to calculate a positioning result of the target terminal; or, the first transmitting module 193 is further configured to report a first measurement report to a network device, where the first measurement report is used by the network device to calculate a positioning result of the target terminal. The target terminal is at least one of the device or the second terminal, and the first measurement report includes a measurement result of the first reference signal.

In an optional design of the present disclosure, the first transmitting module 193 is configured to transmit a second reference signal to the second terminal, where a second measurement report is reported by the second terminal to a network device, and the second measurement report includes a measurement result of the second reference signal; and a first transmitting module 194 is further configured to report a first measurement report to a network device, where the first measurement report and the second measurement report is used by the network device to calculate a positioning result of the target terminal; or, the first transmitting module 193 is configured to transmit a first measurement report and a second reference signal to the second terminal, where the first measurement report and a second measurement report is reported by the second terminal to a network device, and the first measurement report and the second measurement report are used by the network device to calculate a positioning result of the target terminal; or, the first transmitting module 193 is configured to transmit a first measurement report and a second reference signal to the second terminal, where the first measurement report and a second measurement report are used by the second terminal to calculate a positioning result of the target terminal; or, the first transmitting module 193 is configured to transmit a second reference signal to the second terminal; and the device receives a second measurement report transmitted by the second terminal; and the first positioning module 192 is configured to calculate a positioning result of the target terminal based on the first measurement report and the second measurement report. The target terminal is at least one of the device or the second terminal, the first measurement report includes a measurement result of the first reference signal, the second measurement report includes a measurement result of the second reference signal.

In an optional design of the present disclosure, the first reference signal is used for determining location information of the target terminal. The location information includes at least one of an absolute location or a relative location.

In an optional design of the present disclosure, a measurement result includes at least one of: RSRP/RSRQ of a reference signal; an angle of arrival of the reference signal; an angle of departure of the reference signal; a time stamp of the measurement result; a Rx-Tx time difference of the reference signal; a reference signal propagation delay; quality for each measurement result; or a time difference of arrival.

In an optional design of the present disclosure, the first reference signal is used for determining at least one of the location information of the target terminal or the distance information of the target terminal.

In an optional design of the present disclosure, the first reference signal is at least one of: a SL-PRS, a CSI-RS, a DMRS, a PTRS, or a SSB.

In an optional design of the present disclosure, the device further incudes a first generating module 194. The first generating module 194 is configured to generate configuration information of the first reference signal; or, the first receiving module 192 is further configured to receive first information including configuration information of the first reference signal.

In an optional design of the present disclosure, the configuration information includes at least one of: a number of receiving or transmitting terminals for the first reference signal; information of receiving or transmitting terminals for the first reference signal; a type of the first reference signal; or a measurement interval for the first reference signal to receive/transmit.

In an optional design of the present disclosure, the measurement interval of the first reference signal is transmitted by the network device; or, the measurement interval of the first reference signal is configured by the network device upon receiving a request from the device.

In an optional design of the present disclosure, the first information is transmitted by the network device or the second terminal.

In an optional design of the present disclosure, the first generating module 194 is configured to generate configuration information of the second reference signal; or, the first receiving module 192 is configured to receive second information including configuration information of the second reference signal.

In an optional design of the present disclosure, the configuration information of the second reference signal includes at least one of: a number of receiving or transmitting terminals for the second reference signal; information of receiving or transmitting terminals for the second reference signal; a type of the second reference signal; or a measurement interval of the second reference signal.

In an optional design of the present disclosure, the measurement interval of the second reference signal is transmitted by the network device; or, the measurement interval of the second reference signal is configured by the network device upon receiving a request from the device.

To sum up, the method realizes the positioning of the target terminal through the side link, and the positioning result of the target terminal can be obtained by the interaction between terminals, which can improve the positioning efficiency and reduce the calculation cost of the network device. The method also provides a new method for positioning a terminal based on the SL.

FIG. 20 is a block diagram of a device for positioning a terminal according to an exemplary embodiment. The device 2000 includes a second transmitting module 2003.

The second transmitting module 2003 is configured to transmit a first reference signal to a first terminal, where the first reference signal is used for positioning a target terminal, and the first reference signal is a positioning reference signal for a side link.

In an optional design of the present disclosure, the device further includes a second receiving module 2001 configured to receive a first measurement report transmitted by the first terminal.

The device further includes a second positioning module 2002 configured to calculate a positioning result of the target terminal based on the first measurement report, where the target terminal is at least one of the first terminal or the device, and the first measurement report includes a measurement result of the first reference signal.

In an optional design of the present disclosure, the second receiving module 2001 is configured to receive a second reference signal transmitted by the first terminal; and the second transmitting module 2003 is configured to report a second measurement report to a network device, where the second measurement report includes a measurement result of the second reference signal, a first measurement report is reported by the first terminal to a network device, and the first measurement report and the second measurement report are used by the network device to calculate a positioning result of the target terminal; or, the second receiving module 2001 is configured to receive a first measurement report and a second reference signal transmitted by the first terminal; and the second transmitting module 2003 is configured to report the first measurement report and a second measurement report to a network device, where the first measurement report and the second measurement report are used by the network device to calculate a positioning result of the target terminal; or, the second receiving module 2001 is further configured to receive a first measurement report and a second reference signal transmitted by the first terminal; and the second positioning module 2002 is configured to calculate a positioning result of the target terminal based on the first measurement report and a second measurement report; or, the second receiving module 2001 is configured to receive a second reference signal transmitted by the first terminal; and the second transmitting module is further configured to transmit a second measurement report to the first terminal, where the first measurement report and the second measurement report are used by the first terminal to calculate a positioning result of the target terminal. The target terminal is at least one of the first terminal or the device, the first measurement report includes a measurement result of the first reference signal, and the second measurement report includes a measurement result of the second reference signal.

In an optional design of the present disclosure, the first reference signal is used for determining location information of the target terminal. The location information includes at least one of an absolute location or a relative location.

In an optional design of the present disclosure, the measurement result includes at least one of: RSRP of a reference signal, RSRQ of the reference signal; an angle of arrival of the reference signal; an angle of departure of the reference signal; a time stamp of the measurement result; a Rx-Tx time difference of the reference signal; a reference signal propagation delay; quality for each measurement result; or a time difference of arrival.

In an optional design of the present disclosure, the first reference signal is used for determining at least one of location information of the target terminal and distance information of the target terminal. The location information includes at least one of an absolute location or a relative location.

In an optional design of the present disclosure, the first reference signal is at least one of: a SL-PRS, a CSI-RS, a DMRS, a PTRS, a SSB, or a SRS. The second reference signal is at least one of: a SL-PRS, a CSI-RS, a DMRS, a PTRS, a SSB or a SRS. A type of the second reference signal is identical to or different from a type of the first reference signal.

In an optional design of the present disclosure, the second generating module 2004 is configured to generate configuration information of the first reference signal; or, the second receiving module 2001 is configured to receive first information including configuration information of the first reference signal.

In an optional design of the present disclosure, the first information includes at least one of: a number of receiving or transmitting terminals for the first reference signal; information of receiving or transmitting terminals for the first reference signal; a type of the first reference signal; or a measurement interval of the first reference signal.

In an optional design of the present disclosure, the measurement interval of the first reference signal is transmitted by the network device; or, the measurement interval of the first reference signal is configured by the network device upon receiving a request from the device.

In an optional design of the present disclosure, the first information is transmitted by the network device or the first terminal.

In an optional design of the present disclosure, the second generating module 2004 is configured to generate configuration information of a second reference signal; or, the second receiving module 2001 is further configured to receive second information including configuration information of a second reference signal.

In an optional design of the present disclosure, the configuration information of the second reference signal includes at least one of: a number of receiving or transmitting terminals for the second reference signal; information of receiving or transmitting terminals for the second reference signal; a type of the second reference signal; or a measurement interval of the second reference signal.

In an optional design of the present disclosure, the measurement interval of the second reference signal is transmitted by the network device; or, the measurement interval of the second reference signal is configured by the network device upon receiving a request from the device.

In an optional design of the present disclosure, the second information is transmitted by a LMF or the network device or the first terminal.

To sum up, the method realizes the positioning of the target terminal through the side link, and the positioning result of the target terminal can be obtained by the interaction between terminals, which can improve the positioning efficiency and reduce the calculation cost of the network device. The method also provides a new method for positioning a terminal based on the SL.

Figure 21:
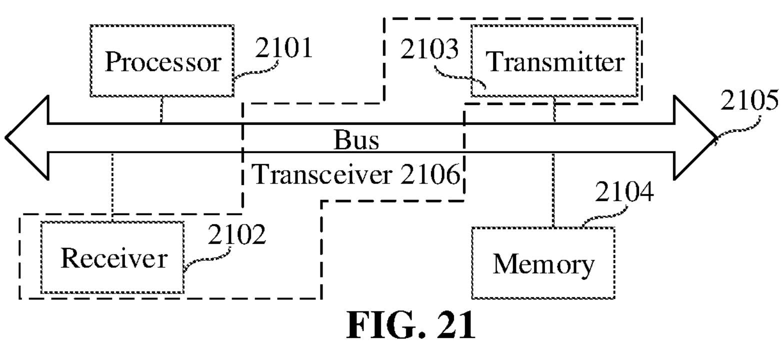
FIG. 21 is a schematic structural diagram of a network device according to an exemplary embodiment.

FIG. 21 is a schematic structural diagram of a communication device (a first terminal or a second terminal or a network device) according to an embodiment of the present disclosure. For example, the communication device may be configured to perform the method for positioning a terminal described above. Specifically, the communication device 2100 may include a processor 2101, a receiver 2102, a transmitter 2103 a memory 2104 and a bus 2105.

The processor 2101 includes one or more processing cores and performs various functional application and information processing through executing software programs and modules.

The receiver 2102 and the transmitter 2103 may be implemented as a transceiver 2106 which may be a communication chip.

The memory 2104 is connected to the processor 2101 through the bus 2105.

The memory 2104 may be configured to store a computer program, and the processor 2101 may be configured to execute the computer program to implement the various operations performed by the terminal or network device (an access network entity, a core network element or a core network entity) in the above method embodiments.

The transmitter 2103 is configured to perform the operations related to transmission in the various method embodiments described above. The receiver 2102 is configured to perform the operations related to reception in the various method embodiments described above. The processor 2101 is configured to perform operations other than the transmission and reception operations in the various embodiments described above.

In addition, the memory 1304 may be implemented by any type of volatile, non-volatile storage device or a combination of them. The volatile or non-volatile storage device includes but not limited to: a random access memory (RAM) and Read-Only Memory (ROM), Erasable Programmable Read-Only Memory (EPROM), Electrically Erasable Programmable Read-Only Memory (EEPROM), flash memory or other solid-state storage technology, compact disc read-only memory (CD-ROM), digital video disc (DVD) or other optical storage, cassette, magnetic tape, magnetic disk storage or other magnetic storage devices.

Embodiments of the disclosure also provide a non-volatile computer-readable storage medium having stored a computer program thereon that, when executed by a processor, causes the processor to performed the method for positioning a terminal.

Embodiments of the disclosure also provide a chip including at least one of a programmable logic circuit or a program instruction, which is used for implementing the method for positioning a terminal when the chip works on a terminal device.

Embodiments of the present disclosure also provide a computer program product or a computer program including computer instructions, where the computer instructions are stored in a computer-readable storage medium, and a processor of a terminal device reads and executes the computer instructions from the computer-readable storage medium to implement the method for positioning a terminal.

The technical schemes provided by the embodiments of the present disclosure includes following beneficial effects.

The method realizes the positioning of the target terminal through the side link, and the positioning result of the target terminal can be obtained by the interaction between different terminals, which can improve the positioning efficiency and reduce the calculation cost of the network device. The method also provides a brand-new positioning service under the SL-based communication scenario.

It should be understood that the reference to "multiple" herein refers to two or more. The term "and/or" is only to describe an association relationship between associated objects and represents that three kinds of relationships may exist. For example, A and/or B may represent three conditions: i.e., independent existence of A, existence of both A and B and independent existence of B. In addition, the character "/" in the disclosure generally indicates that the associated objects before and after this character is in an "or" relationship.

Other embodiments of the present disclosure will be readily contemplated by those skilled in the art after considering the specification and practicing the invention disclosed herein. The present application is intended to cover any variations, uses, or adaptations of the present disclosure that follow the general principles of the present disclosure and include well-known common sense or customary technical means in the art that are not disclosed in the present disclosure. The specification and embodiments are considered exemplary only, and the true scope and spirit of the present disclosure are indicated by the following claims. The technical solution of the present disclosure is further described in detail below in conjunction with the accompanying drawings and embodiments.

It should be understood that the present disclosure is not limited to the precise structure already described above and shown in the drawings and various modifications and changes may be made without departing from its scope. The scope of the present disclosure is limited only by the appended claims.

The invention claimed is:

1. A method for positioning performed in a first terminal, comprising:

receiving, by the first terminal, a first reference signal transmitted by a second terminal, the first reference signal being a positioning reference signal for a side link; and transmitting, by the first terminal, a first measurement report and a second reference signal to the second terminal, the first measurement report and a second measurement report being reported by the second terminal to a network device for calculating a positioning result of the target terminal; or, transmitting, by the first terminal, a first measurement report and a second reference signal to the second terminal, the first measurement report and a second measurement report being used by the second terminal to calculate a positioning result of the target terminal, the target terminal being at least one of the first terminal or the second terminal, the first measurement report comprising a measurement result of the first reference signal, the second measurement report comprising a measurement result of the second reference signal, and the second reference signal being a positioning reference signal for the side link.

2. The method of claim 1, wherein a measurement result comprises at least one of:

reference signal received quality (RSRQ) of the reference signal; an angle of arrival of the reference signal; an angle of departure of the reference signal; a receive-transport (Rx-Tx) time difference of the reference signal;

a reference signal propagation delay; quality for each measurement result; or a time difference of arrival.

3. The method of claim 2, wherein the measurement result further comprises at least one of: reference signal received power (RSRP) of the reference signal; or a time stamp of the measurement result.

4. The method of claim 1, wherein the first reference signal is used for determining at least one of location information of the target terminal or distance information of the target terminal, the location information comprises at least one of an absolute location or a relative location.

5. The method of claim 1, further comprising:

receiving, by the first terminal, first information comprising configuration information of the first reference signal from the second terminal.

6. The method of claim 1, further comprising:

receiving, by the first terminal, second information comprising configuration information of the second reference signal from the second terminal.

7. The method of claim 1, wherein the first terminal comprises a plurality of terminals, and the second terminal comprises one terminal, wherein the receiving, by the first terminal, a first reference signal transmitted by a second terminal comprises:

receiving, by each of the plurality of terminals, a first reference signal transmitted by the one terminal, wherein the transmitting, by the first terminal, a first measurement report and a second reference signal to the second terminal, the first measurement report and a second measurement report being reported by the second terminal to a network device for calculating a positioning result of the target terminal comprises:

transmitting, by each of the plurality of terminals, a first measurement report and a second reference signal to the one terminal, wherein first measurement reports and second measurement reports being reported by the one terminal to a network device for calculating a positioning result of the target terminal.

8. The method of claim 1, wherein the first terminal comprises one terminal, and the second terminal comprises a plurality of terminals, wherein the receiving, by the first terminal, a first reference signal transmitted by a second terminal comprises:

receiving, by the one terminal, a first reference signal transmitted by each of the plurality of terminals, wherein the transmitting, by the first terminal, a first measurement report and a second reference signal to the second terminal, the first measurement report and a second measurement report being reported by the second terminal to a network device for calculating a positioning result of the target terminal comprises:

transmitting, by the one terminal, a first measurement report and a second reference signal to each of the plurality of terminals, wherein first measurement reports and second measurement reports being reported by the plurality of terminals to the network device for calculating the positioning result of the target terminal.

9. A first terminal, comprising:

a processor; and a memory for storing processor-executable instructions, wherein the processor is configured to execute the executable instructions to cause the first terminal to:

receive a first reference signal transmitted by a second terminal-via the transceiver, the first reference signal being a positioning reference signal for a side link; and transmit a first measurement report and a second reference signal to the second terminal, wherein the first measurement report and a second measurement report are reported by the second terminal to a network device for calculating a positioning result of the target terminal; or, transmit a first measurement report and a second reference signal to the second terminal, wherein the first measurement report and a second measurement report are used by the second terminal to calculate a positioning result of the target terminal, wherein the target terminal is at least one of the first terminal or the second terminal, the first measurement report comprises a measurement result of the first reference signal, the second measurement report comprises a measurement result of the second reference signal, and the second reference signal is the positioning reference signal for the side link.

10. The first terminal of claim 9, wherein the processor is further configured to execute the executable instructions to cause the first terminal to:

receive first information comprising configuration information of the first reference signal from the second terminal.

11. The first terminal of claim 9, wherein the processor is further configured to execute the executable instructions to cause the first terminal to receive second information comprising configuration information of the second reference signal from the second terminal.

12. The first terminal of claim 9, wherein the first reference signal is used for determining at least one of location information of the target terminal or distance information of the target terminal, the location information comprises at least one of an absolute location or a relative location.

13. The first terminal of claim 9, wherein a measurement result comprises at least one of: reference signal received power (RSRP) of the reference signal; or a time stamp of the measurement result.

14. The first terminal of claim 13, wherein the measurement report further comprises at least one of: reference signal received quality (RSRQ) of the reference signal;

an angle of arrival of the reference signal; an angle of departure of the reference signal; a receive-transport (Rx-Tx) time difference of the reference signal; a reference signal propagation delay; quality for each measurement result; or a time difference of arrival.

15. A second terminal, comprising:

a processor; and a memory for storing processor-executable instructions, wherein the processor is configured to execute the executable instructions to cause the second terminal to:

transmit a first reference signal to a first terminal, the first reference signal being used for positioning a target terminal, and the first reference signal being a positioning reference signal for a side link; and receive a first measurement report and a second reference signal from the first terminal; and report the first measurement report and a second measurement report to a network device for calculating a positioning result of the target terminal; or, receive a first measurement report and a second reference signal from the first terminal; and calculate a positioning result of the target terminal based on the first measurement report and a second measurement report, the target terminal being at least one of the first terminal or the second terminal, the first measurement report comprising a measurement result of the first reference signal, and the second measurement report comprising a measurement result of the second reference signal, and the second reference signal being a positioning reference signal for the side link.

16. The second terminal of claim 15, wherein the first reference signal is used for determining at least one of location information of the target terminal or distance information of the target terminal, the location information comprises at least one of an absolute location or a relative location.

17. The second terminal of claim 15, wherein a measurement result comprises at least one of: reference signal received power (RSRP) of the reference signal;

or a time stamp of the measurement result.

18. The second terminal of claim 17, wherein the measurement report further comprises at least one of: reference signal received quality (RSRQ) of the reference signal;

an angle of arrival of the reference signal; an angle of departure of the reference signal; a receive-transport (Rx-Tx) time difference of the reference signal; a reference signal propagation delay; quality for each measurement result; or a time difference of arrival.

19. The second terminal of claim 15, wherein the processor is configured to execute the executable instructions to cause the second terminal to:

transmit first information comprising configuration information of the first reference signal to the first terminal.

20. The second terminal of claim 15, wherein the processor is configured to execute the executable instructions to cause the second terminal to:

transmit second information comprising configuration information of the second reference signal to the first terminal.

* * * * *